US008009873B2

(12) United States Patent
Chapman

(10) Patent No.: US 8,009,873 B2
(45) Date of Patent: *Aug. 30, 2011

(54) METHOD AND APPARATUS FOR PROVIDING IDENTIFICATION

(75) Inventor: Bryan P. Chapman, Brisbane (AU)

(73) Assignee: Neotec Holdings Limited, Port Villa (VU)

( * ) Notice: Subject to any disclaimer, the term of this patent is extended or adjusted under 35 U.S.C. 154(b) by 1031 days.

This patent is subject to a terminal disclaimer.

(21) Appl. No.: 11/145,852

(22) Filed: Jun. 6, 2005

(65) Prior Publication Data

US 2005/0258238 A1    Nov. 24, 2005

Related U.S. Application Data

(63) Continuation-in-part of application No. 08/793,415, filed on Apr. 30, 1997, now Pat. No. 6,902,108.

(51) Int. Cl.
*G06K 9/00* (2006.01)

(52) U.S. Cl. ........ 382/115; 382/116; 235/375; 235/380; 235/382; 235/382.5; 235/384; 340/5.82; 340/5.83

(58) Field of Classification Search .................. 235/375, 235/380, 382, 382.5, 384; 340/5.82, 5.83; 382/115–127
See application file for complete search history.

(56) References Cited

U.S. PATENT DOCUMENTS

| | | | |
|---|---|---|---|
| 3,569,619 A | | 3/1971 | Simjian |
| 3,891,900 A | * | 6/1975 | Gallant .......................... 361/167 |
| 4,121,574 A | * | 10/1978 | Lester ........................... 600/479 |
| 4,253,086 A | * | 2/1981 | Szwarcbier .................. 340/5.83 |
| 4,636,622 A | | 1/1987 | Clark |
| 4,641,349 A | * | 2/1987 | Flom et al. ..................... 382/117 |
| 4,821,118 A | * | 4/1989 | Lafreniere .................... 348/156 |
| 5,038,283 A | | 8/1991 | Caveney |
| 5,095,196 A | * | 3/1992 | Miyata .......................... 235/382 |
| 5,144,680 A | * | 9/1992 | Kobayashi et al. ............ 382/124 |
| 5,193,855 A | * | 3/1993 | Shamos ........................ 382/124 |
| 5,245,329 A | * | 9/1993 | Gokcebay .................... 340/5.33 |
| 5,291,399 A | * | 3/1994 | Chaco ........................... 235/380 |

(Continued)

FOREIGN PATENT DOCUMENTS

EP   0520455 A1   12/1992

(Continued)

OTHER PUBLICATIONS

US Department of Commerce, Guidelines on the Evaluation of Techniques for Automated Personal Identification, United States, US Department of Commerce, Apr. 1, 1977.

(Continued)

*Primary Examiner* — Bhavesh Mehta
*Assistant Examiner* — Daniel Zeilberger
(74) *Attorney, Agent, or Firm* — Kleinberg & Lerner, LLP; Marvin H. Kleinberg

(57) ABSTRACT

A method of providing identification of an entity includes maintaining a database of identification data specific to the appearance and condition of entities, providing a unique description for each entity enabling access to the entity's identification data in the database, providing identification means adapted for portage with the entity and containing the unique description and maintaining secondary databases containing the entity's identification data as acquired from prior encounters so that multiple comparisons can be made to assure that the individual bearing the identification means is the same individual to whom the identification means were issued.

25 Claims, 14 Drawing Sheets

U.S. PATENT DOCUMENTS

| | | | |
|---|---|---|---|
| 5,321,751 A | | 6/1994 | Ray |
| 5,513,272 A | * | 4/1996 | Bogosian, Jr. ............... 382/116 |
| 5,548,110 A | * | 8/1996 | Storch et al. ............. 235/462.07 |
| 6,111,506 A | * | 8/2000 | Yap et al. ................... 340/572.1 |
| 2002/0046347 A1 | * | 4/2002 | Murase et al. ................ 713/201 |
| 2003/0215114 A1 | * | 11/2003 | Kyle ............................ 382/115 |

FOREIGN PATENT DOCUMENTS

| | | |
|---|---|---|
| FR | 2645992 A1 | 10/1990 |
| WO | WO 86/06527 A1 | 11/1986 |
| WO | WO-94/10659 A1 | 5/1994 |
| WO | WO 94/10659 A1 | 5/1994 |

OTHER PUBLICATIONS

Trauring, M., "Automatic Comparison of Finger-Ridge Patterns," Nature, vol. 197, 1963, pp. 938-940.

Pollock, A., "Recognizing the Real You," The New York Times, Sep. 24, 1981, p. 2.

Miller, B., "Vital Signs of Identity," IEEE Spectrum, Feb. 1994, pp. 22-30.

US Department of Commerce, Guidelines on the Evaluation of Techniques for Automated Personal Identification, Apr. 1, 1977.

Trauring M, "Automatic Comparison of Finger-Ridge Patterns," Nature, vol. 197, 1963, pp. 938-940.

Pollock A, "Recognizing the Real You," The New York Times, Sep. 24, 1981, p. 2.

Millar B, "Vital Signs of Identity," IEEE Spectrum, Feb. 1994, pp. 22-30.

* cited by examiner

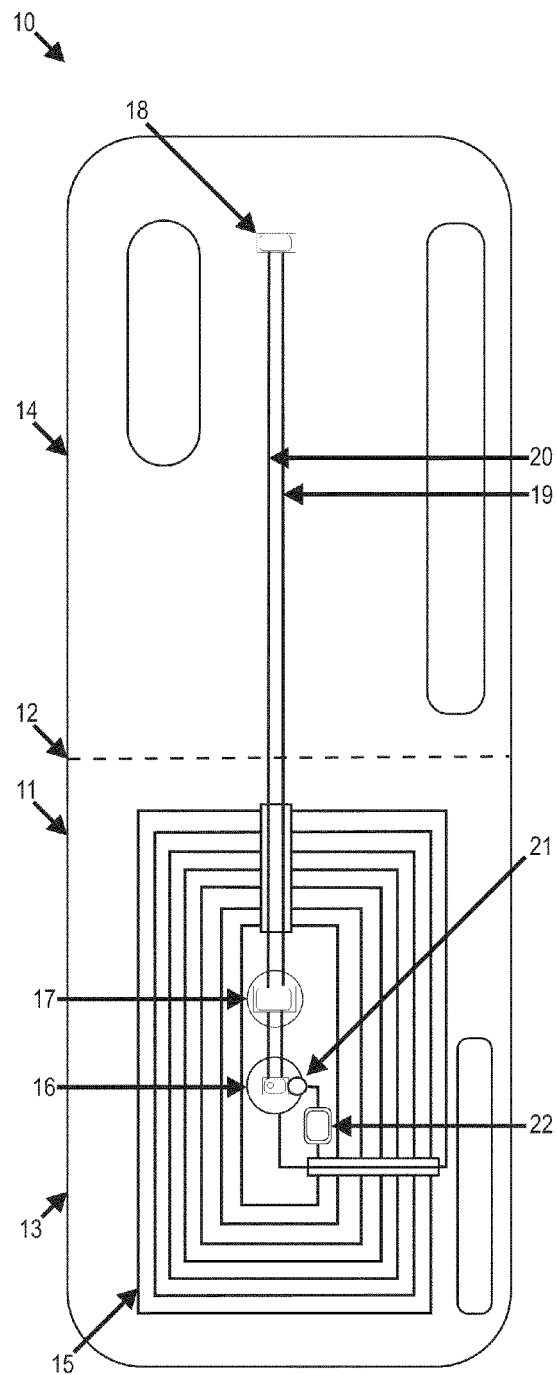
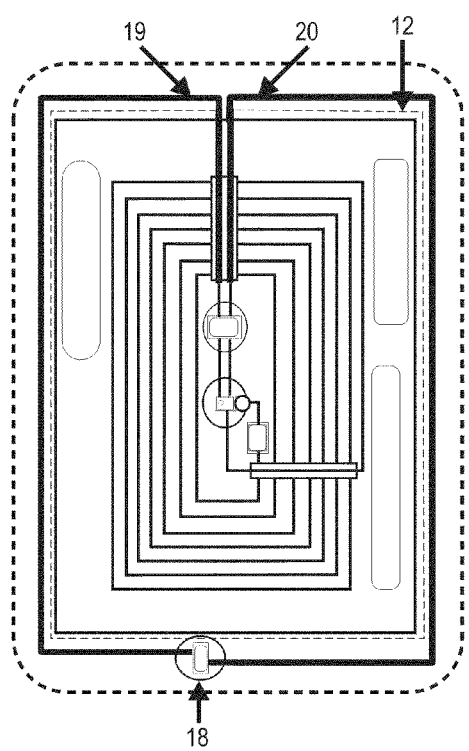
FIG. 1A
FIG. 1B

METHOD AND APPARATUS FOR PROVIDING IDENTIFICATION

CROSS REFERENCE TO RELATED APPLICATIONS

This is a continuation-in-part of my application for letters patent, Ser. No. 08/793,415, filed Apr. 30, 1997 now U.S. Pat. No. 6,902,108.

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISK APPENDIX

Not Applicable

BACKGROUND OF THE INVENTION

This invention relates to a method of and apparatus for providing identification. This invention has particular but not exclusive application to a method of and apparatus for identifying persons and unique articles which retain or are intended to retain a lifelong distinctive identity such as computers, computer records, computer software, network hardware including RF local and wide area network access equipment, databases, database records, categorized watch lists for individuals, portable computer storage devices, audit archival equipment, passports, documents of identity, documents of registration, operator license documents, paintings and other objects of art. Such individual persons, equipment, records and articles are hereinafter collectively referred to as "an individual or individuals or entities". In other aspects of the invention an "individual or individuals" may be used for identifying freightable articles such as shipping containers, the contents of shipping containers, boxes for shipping, airplanes, ships, motor vehicles and their respective individual components or the like.

All National Governments via their respective Departments issue Identity Documents such as but not limited to National Identity Document (paper &/or card), Passports (of various International Civil Aviation Organization [ICAO] specified types &/or sizes), Driver License (paper &/or card), Operator License (paper &/or card), Transport Worker Identity (paper &/or card), Departmental Officers Identity (paper &/or card), Departmental Visitor Identity (paper &/or card), Authorization Document (paper &/or card) & Vehicle/Truck/Aircraft/ship etc Registration Identity Documents (paper &/or card), as well as other National Asset Identity Document concerning their respective National interests including National Critical Infrastructure.

In addition, the several commercial organizations/industries involved in Security, Travel (domestic &/or International), Air freight, Ship Cargo etc. also issue Identity Documents to their employees, Club Membership Document (paper &/or card), and, in addition, some also issue Checked Baggage, Air Cargo Identification Documentation (for both the Container & its Contents) as well as Sea/Road Shipping Containers.

Positive identification of individuals is important for preventing unauthorized access to or passage from selected locations or facilities such as banks, accounts, etc. and restricted areas such as secure buildings, medical diagnostic and treatment areas, airport terminals and all associated restricted areas, whether on or off site of the respective airport or the like. Positive identification of individuals is particularly important for making Government level decisions concerning travelers' access to countries, especially international travelers. Individuals that assume the Identity of or obtain Official Departmental Identity documentation of another Individual (identity theft) but having descriptive details referring to themselves (being not containers, motor vehicles or the like, can be especially troubling but can be intercepted through the use of biometric data.

International travelers are often subjected to disruptive and excessive delays upon arrival at and/or departure from airport terminals as officials attempt to establish the bona fides of each traveler by personally interrogating each traveler and comparing the person being interrogated with the available identification indicia such as passports, memory lists and computer files and the like, with the aim of identifying any traveler who is unauthorized to enter the country or whose details are on lists of restricted individuals. This entry check is also utilized to record details of movement of travelling individuals to and from each country visited.

The presently available methods of positive identification of an individual typically include passports, knowledge of restricted or secured information such as a password, possession of a restricted article such as a pass key, or physical appearance of the individual to which an Identity Document refers. If the Identity Document is in an electronic medium, malefactors might use a technique generally known as "data stripping" to duplicate the electronic signature of the original document or might replace the details of the lawful holder with details relating to the impostor.

Security based upon knowledge of restricted information or possession of a restricted article may be compromised without discovery since the information may be obtained from its rightful owner. Consequently such information does not provide a satisfactory method for positive identification of an individual in all cases, particularly where such identification has to be made quickly.

Methodologies relying on physical appearance, commonly referred to as biometric techniques such as fingerprint analysis, thermograms, opthalmic scans and DNA analysis are considered less vulnerable to mistaken identity and therefore are attractive to authorities but to date have been difficult to utilize successfully. Mostly such methodologies require a vast databank containing the particular biometric data for each individual, which may be difficult and/or slow to locate and access.

A recent development in "imposter detection" is an extended requirement by the United States Government, which it has imposed on other National Governments that cooperate with the US in what is known as the US Visa Waiver Program (VWP), which requires that each Nation, in order to obtain or maintain a VWP status, must develop and begin the issue to their respective eligible passport holders, a tamper resistant, machine-readable travel document (MRTD) that is embedded with contactless Integrated Circuit (IC) Chips.

One known method of utilizing biometric techniques for identification of an individual for the purpose of restricting entry to an area to authorized persons only, includes providing each of the authorized individuals with a card containing biometrics identifiers. Further any such MRTD issued that contains such biometrics identifiers must comply with the standards laid down and endorsed by the International Civil Aviation Organization (ICAO). These are basic standards that provide for a portable database in Radio Frequency Identification ("RFID") form. This is deficient in the absence of access to the original Issuing Countries' Database. Further, such a database must be maintained in such a way as to prevent substitutions or multiple enrollments (across one or more additional Countries).

Several National Governments accordingly will need to issue biometric passports to their citizens in the near future. Most, if not all, biometric passports will, at a basic level, be ICAO compliant, in that they will have a contactless chip in the MRTD regardless of its format as a paper or a card type travel document. However, in addition to defeating internal corruption, organized crime or terrorist activity, each MRTD will additionally need to store a unique description in the form of biographic and biometric information about the passport holder that can perform an additional database file locator function.

A developed national or international interoperable biometric based identification system for individuals and unique articles that are intended to maintain a life long identity, will be referred to hereinafter as the "System". The System must be instantly accessible across any individual Nation and extend to any other authorized Nation. This instant accessibility extends to all authorized individuals. The status of such authorized individuals may change due to time of day, day or month based upon roster duty. Such individuals may also face immediate withdrawal of access to either all or particular areas based upon changes in assignment.

Individuals that are first both verified and authenticated may be allowed access to and control of (if applicable) the System's full multi-media capacity. Such verification and authentication occurs in a fully encrypted, reverse accountable operating system. Each piece of individual hardware that can access or input data to the System will be biometrically identified and irrevocably linked to an access code and encryption key that may be a biometrically based encryption key for all such equipment components and System operators, each with and individual encryption key and/or access code as well as a session key, in order to provide an irrevocable biometric audit trail of all system operations, system modules, other transmission equipment and transactions.

This will improve efficiency in commerce and trade by pro-actively detecting impostors to prevent terrorist and organized criminal activity The present invention will simultaneously and pro-actively protect the privacy of individuals by having the ability to morph their identity into several aliases so that national and international data warehoused can be prevented from obtaining every detail about them, their lifestyle habits, addresses including GPS location, and any images of the individual or their assets. This would foreclose, for example, linking GPS location to satellite imagery later providing such information to unknown third persons without the individual's knowledge or informed consent.

SUMMARY OF INVENTION

The present invention provides a method and apparatus that addresses this issue while simultaneously providing a biometric reverse audit capability, privacy and Morphed Identification (or anonymization) mechanism, as part of the wider solution to provide a pro-active national security mechanism that is capable of interoperability across an entire Country (including inferior jurisdictions, if necessary) and, by reciprocity, across other Nations in real time According to the present invention, biometric data specific to an individual can be stored on a card. The card can be proffered at a reading station wherein the biometric data is read by a card reader or the like and compared with the biometric properties of the individual proffering the card. A high correlation between the card data and the contemporaneously acquired data of the individual proffering the card results in access and a low correlation causes a refusal. This system however does not prevent unauthorized cards being produced which may be used for gaining unauthorized access to a facility.

Another known method includes comparing the biometric data on a card proffered by an individual to a previously created database of biometric data of authorized individuals. Such a system can be foiled by individuals who have obtained a card from its rightful owner in the absence of a capability of acquiring the biometric information from the individual proffering the card.

The present invention aims to alleviate at least one of the above disadvantages and to provide a method of and apparatus for providing identification which will be reliable and efficient in use. With the foregoing in view, this invention, in one aspect, resides broadly in a method of providing identification of an entity, whether an individual or a freightable article, including the steps of:

maintaining a database of identification data specific to the appearance and/or condition of the entity;

providing a unique description for each entity enabling access to the entity's identification data in the database; and providing identification means adapted for portage with the individual or article and containing the unique description.

The identification data contained in the database may be data representative of an identifiable attribute and preferably includes biometric information such as thermograms, fingerprints, photographs, voice prints, opthalmic data, DNA sequences or the like. Preferably the biometric information and medical condition is information which may be obtained non-invasively and, suitably, information which can be obtained or captured by imaging, vapour analysis expelled from an individual or article from a remote detection location and the data representative of these attributes may be updated from time to time to take account of deterioration or changes in the individual such as aging or changed medical condition. If the individual or article is not a living organism, then other applicable additional identifiable attributes such as surface images, thermal, infra red or acoustic response patterns or the like may be utilized and the data representative of these attributes may be updated from time to time to take account of deterioration or changes in the article.

Preferably, the database contains one protected parcel of identification data in respect of each entity, whether individual or freightable article. The protected parcel of identification data may be representative of more than one identifiable attribute such as thermogram and fingerprint. Each parcel may be associated with one or more add-on only files which may record historical or other information, for example, medical details such as blood group, treatment history and medical image data or the like in the case of an individual, or proprietorship, manufacturer, individual packer, freight handler, etc., in the case of a freightable article. The system utilizing this method and apparatus for individuals integrated with freightable articles will facilitate profiled and operational multi media shared pro-active developing situational awareness, which may only be detectable if several seemingly unrelated data streams from several different locations can be analyzed both electronically and statistically with projected outcomes self synchronized nationally as well as globally. Any authorized system operator then can become aware of the same output data simultaneously. This methodology will be referred to herein as being network centric or network centric enabled and has additional application within the medical delivery industry.

The database may be arranged to check existing data prior to approving entry of an identifiable attribute pertaining to an individual or freightable article so as to ensure that data specific to each individual or article is linked to one unique description only or it may be arranged to continuously scan the data, checking for any matches or defined similarities which may indicate the existence of more than one description for an individual or article, which, in all probability, would be a forgery.

The unique description may be any information or data such as an address in a database sufficient to isolate a file in respect of an individual or article in a database and may include an individual's name, date of birth, nationality or like characteristics. Preferably however, the unique description, in whole or in part, is a unique file code derived and computed from the biometric data non-invasively obtained from the individual or article to which the unique description is assigned. The unique description may be arranged according to an international standard so as to enable positive identification of individuals or articles such as shipping containers, etc., on a global basis. Preferably however, the unique description is a unique file code assigned to the individual or article. The unique description may be arranged according to an international standard so as to enable positive identification of individuals or articles such as shipping containers on a global basis.

Preferably the unique description is machine readable only and of a type which may be protected by protection means. The protection means may be an encoding or encryption of the unique description or it may be or include a secure access code or style which may also be embedded in a surface image which may incorporate a tamper detection function.

Preferably the identification means is an identification device as described hereinafter. However, the identification means may be, under some circumstances, other suitable means such as, for example, the enrolled individual who presents the device before remote identification data collection equipment and which may be complemented with a number or code to be memorized by each individual and additionally proffered to obtain access to the identification data in the database.

In another aspect this invention resides broadly in an identification device including information carrier means and a unique description stored in the carrier means. The information carrier means may be a card, token, plaque or the like and the unique description may be included thereon in any readable form. Preferably the unique description is machine readable from a remote, proactive location. For example, the unique description may be readable by a remote imaging system or laser or infra red radiation scanner or the like.

Preferably, the card will include additional, card specific data. Such card specific data may for example include a pattern or ornamentation applied to a face of the card and readable by image reading equipment. Alternatively, the card specific data may be an individual signal contained in a transponder and readable from a remote location.

In another aspect, this invention resides broadly in a method of facilitating travel of an identifiable group of individuals presently identified or to be identified as previously described, including: accessing the database or databases at or after an indication by an individual of the group of an intent to travel, accessing being enabled using an identification matrix. This would include data corresponding to "first seen", "last seen" and "now seen" three way comparisons of non-invasively obtained biometric data.

To accomplish this, a packet of identification data in respect of the identified group of individuals is compiled, the packet of data is retrieved to a localized monitoring area at which said identified group is assembled or confirms their intention to travel, the data of each individual in the retrieved packet of information is compared with corresponding data generated at the localized monitoring area, and the individuals with an operative correlation of data are allowed to continue on their travels.

This method provides the advantage that relatively large databases may be interrogated quickly either before travel or during confinement of the group for a prolonged travel period, to assemble a relatively small packet of data which may be readily localized to permit almost instantaneous positive identification of individuals in the group to be achieved and thereby facilitate their movement across restricted borders. The database may be an international database. Preferably however, each country maintains a national database containing information in respect of citizens of that country. Each national database may also include information in respect of foreign citizens who have previously entered each respective country, thereby providing easy access to data in respect of those persons who frequently travel to and from a particular country.

This may be contained in an add-on only file. The database or databases may be accessed upon instructions from the departure station or the destination station. The national databases may also include a restricted individuals' database containing identification data in respect of individuals who are restricted from entering or leaving the country by court order or who are known criminals or the like. All members of the group may be quickly compared against such a database.

The packet of identification data may include parcels of identification data in respect of each member of the identified group of individuals and may relate to any group of individuals. A group may include all passengers ticketed for a particular vehicular movement such as a flight, train or bus journey, voyage or the like. In a preferred form, the identification data includes the identification data specific to each individual, such as the individual's thermogram or retinal scan, with travel information such as travelling companions and seat allocation being provided in the add-on only files.

This may provide information and an audit trail which officials may use to readily identify useful information concerning an individual. This is particularly advantageous if one individual is identified as being unauthorized. The packet of identification data compiled may include data taken from each individual's identification means and other information provided by the individual.

However, in a preferred form of the invention, the identification data includes data specific to each individual which is retrieved from the database.

Preferably, the packet of data is compiled at the departure station, although it may be compiled at the national database or another suitable compiling station and be transmitted to a monitoring station for storage in a temporary storage means. Preferably, the packet of data is transmitted in an encrypted form so as to prevent interference from unauthorized persons.

The issue of Biometric based travel documents poses a particularly serious problem as global interoperability is required involving not only first world countries, but all third world countries, as well. Accordingly, internal departmental corruption poses particular difficulties in regard to security relating to identity change and encryption key security as well as the traditional vulnerability of high technology document forgery or Identity substitution.

Accordingly one aspect of this invention resides in the ability to provide a method, apparatus and hardware that allows any individual to covertly self detect themselves and simultaneously causes a flag alert that biometrically identifies them interactively immediately, should there be an attempted unlawful or unauthorized identity change within the travel document global loop. Further, to improve efficiency of operations and prevent an imposter from covertly identifying himself to travel authorities, The localized monitoring area may be a monitoring station located at a departure airport or a destination airport or any other suitable station and the packet of data may be retrieved at one or more monitoring stations. In a preferred form of the invention the packet of data is compiled at the departure airport where it is temporarily stored and retrieved for comparison with departing passengers and also transmitted to the destination airport for comparison with the passengers as they arrive.

Preferably the identification means carried by each individual includes a unique description which is readable from a remote location as previously described. Such identification means provides an individual with the necessary means enabling passive confirmation of the individual's identity by being monitored remotely and compared with the identification data in the database. Alternatively, individuals may be required to present their respective identification means to a reader at a transit or monitoring station for monitoring purposes.

Whilst the individual could be compared visually by an operator with identification data in the form of an image retrieved automatically from the database upon reading the identification means at the monitoring station, it is preferred that the comparison be a non-subjective comparison performed mathematically or electronically such that human error or purposeful wrongdoing is avoided. In a preferred form of the invention the identification data is a thermogram which may be compared with the corresponding passenger by any suitable means such as those disclosed in U.S. Pat. No. 5,163,094 to Prokowski.

In another aspect of the invention, there is provided a method of facilitating movement of freightable articles such as shipping containers including:

sealing said article with an identifiable sealing means which must be damaged in order to obtain access to said article;

entering information in relation to said sealing means and/or said article into said database;

checking said sealing means at a monitoring station to determine whether the article has been accessed;

retrieving the data to a localized monitoring area at which said article is stored;

comparing retrieved data in respect of the article with corresponding data generated at the localized monitoring area, and permitting articles with an operative correlation of data to proceed to destination without inspection.

Preferably, the freightable article is identified according to the method of providing identification previously described. It is also preferred that the database is accessed at a time on or after allocation of the article to an identifiable shipping movement to enable positive identification of the article. The identifiable sealing means can be an identification device as previously described and which has been suitably formed for attachment to an article in such manner that the device must be broken in order to gain access to the contents of the article.

It is also preferred that the identifiable sealing means have a unique seal description included thereon in a readable form. For example, the unique seal description may be an array of numerical characters which is sufficient to isolate a file in respect of an individual seal and/or an individual article. The identifiable sealing means may also include unique seal specific data such as a pattern or ornamentation applied to a face of the sealing means and readable by image reading equipment. Alternatively, the seal specific data may be an individual signal contained in a transponder and readable from a remote location. Suitably, the sealing means contains no information of value to any individual, only the means enabling access to be gained to the information relating to the sealing means and the article to which it is applied in the database.

In a preferred form of the invention such access will only be available to those authorized persons identified according to the previously described method of providing identification and will only be achieved after satisfactory correlation of that authorized person's biometric data collected at the place of access and the biometric data stored in the corresponding first, last seen, & watch list databases.

Preferably, information in relation to the identifiable sealing means is added to the information contained in the database in respect of the article to which the sealing means is applied. It is also preferred that such information includes the unique seal description and that it is entered as an add-on file. Such add-on file may be superceded by later add-on files, although it is preferred that all current and non-current add-on files are maintained in the database for audit purposes. However, the sealing means may be utilized with a non-identified article and in such case information in respect of the sealing means may be added to a database in respect of the suitable shipping agent or some other suitable selection of first seen databases.

An add-on file may include information in respect of an article and a particular shipping movement. For example, in the case of the article being a shipping container, the information may include details on the personnel who packed the container, the seal details belonging to the contents as packed by each individual sub packer, the time and date packed, the departure station, the arrival station etc, and the contents of the container. Such information may be added directly by authorized personnel.

Furthermore, the database may include information in respect of the identifiable sealing means such as its time and place of issue, individual or firm to whom it was issued, shipping agent code or other similar information important for audit purposes. Preferably such information is also entered by authorized personnel only.

Checking for correlation with the information in the database may include visual checking of the sealing means and or the article, but preferably checking is carried out from a remote monitoring area. The localized monitoring area may be a monitoring station located at packing, manufacturing or dispatch area, departure port or destination port or any other suitable station and the packet of data may be retrieved at one or more monitoring stations.

In one form of the invention wherein a group of many shipping containers or other freightable articles is transported by a single transport vehicle, such as a ship or train, a packet of data comprising information in respect of each container in the group may be compiled at the departure port or other suitable compiling station by accessing the database in respect of each container. Such packet of data may be temporarily stored and retrieved for comparison with departing containers and also transmitted to the destination port for comparison with the containers as they arrive. Preferably, the packet of data is transmitted in an encrypted form so as to prevent interference from unauthorized persons.

Advantageously, relatively large databases may be interrogated before or during shipment to assemble a relatively small packet of data which may be readily localized to permit almost instantaneous positive identification of articles in the group to be achieved and thereby facilitate their movement across restricted borders. The database may be an international database but preferably each country maintains a national database containing information in respect of major articles such as shipping containers or vehicles registered in that country.

In a preferred form of the invention access to the system will only be available to those authorized persons identified according to the previously described method of providing identification and will only be achieved after satisfactory correlation of that authorized person's biometric data. Enrollment in the system is also carefully screened.

Initially, it is determined by an enrolling or "first seen" module that the individual is not already contained within the system by causing all other "first seen" databases to report, according to a pre arranged sequence, that they, in turn, do not have the applicant's biometrics contained within them. Simultaneously the system maintains a side record of the biometric data provided by the "first seen" or enrollment module, pending receipt of that module's decision regarding the applicant and/or that individual's unique description associated with their enabling means. Accordingly, each respective first seen or enrollment module must wait for the last sequenced first seen remote database to report before it enrolls the applicant individual and issues to that individual a respective unique description, and simultaneously advises all other first seen databases of that individual's unique description or other target functionality;

Anonymization in an electronic environment of individuals for the purpose of medical records and the potential harm that can be done to them by data warehousing by the health insurance industry (or any other industry for example the credit industry) buying into private hospitals and pathology laboratories. Additionally protection is afforded to blood donor and recipient identities in the blood transfusion process. For example, donor identity needs to be protected from the technicians that type blood and disease check each donor's blood unit.

As an alternative embodiment of the present invention, there is provided the ability to have instant availability of a secure record of any individual patient's specific condition, genetic profile, life sciences profile or template, previous healthcare look back record, including multi-media instantly available contact to any or all medical service providers, in an instantly understandable and/or graphical/template format that is changeable into any Nation's national language as a patient travels. This paradigm of secure pro-active, reverse accountability in a multi-media information based health care system will improve existing pharmaceutical and medical practices with the knowledge generated from the integration of diverse clinical, biomedical and biometric data. It will also facilitate the production of patient specific genomic medication developed directly from their own genome. In order to prevent adverse outcomes (death), an absolute and trusted identification method is required where all parties and tissue/medical images, files and produced medication are co-ordinated in a network centric secure and accountable environment.

This system of information technology of individual specific shared medical situation awareness will facilitate the pro-active discovery of new individual specific treatments and the practice of pro-active medicine delivery. The seamless integration of all the different medical disciplines into one single interactive delivery system or protocol, will fast-track new patient specific discoveries into individual patient specific research, clinical practice, pro-active individual patient monitoring, and secure individual tailored patient delivery protocol/methodologies as opposed to the existing 'one size fits all' protocol. It can take place in a reverse accountable, multi media system capable of deployment with internationally morphed medication compatibility templates, in any selected language to any global location with internet access.

Biometrically validated secure, verified and accountable access to patient's complete, digitized medical condition, history and medical records in near-real time, will facilitate the ability to remotely develop and prescribe targeted medications and treatments based on each patient's condition, biodata, complete medical profile including their specific genetic profile without the possibility of the mistaken identity of any individual in the practitioner loop or the patient and the associated individuals in the delivery system. Such a system will facilitate the avoidance of mistaken identity and also will avoid medications that might cause adverse effects to the patient. This can be the catalyst that will transform healthcare to a model of secure accountable and patient specific personalized care based on pro-active knowledge of the patient's exact genetic profile and confirmed identity by an authorized system operator.

History has taught us that over the last several hundred years there have been 'pandemics' that spread globally with major mortality rates amongst those individuals that become infected. This invention, in one aspect, aims to utilize the remotely obtainable condition data as it relates to an individual on enrollment, for example, by thermal imaging which, in turn, is stored in two additional primary databases referred to as "first seen condition" and "last seen condition" which are linked to, but separate from, the primary biometric first seen, last seen, and target condition databases. Thereafter as an individual passes through any form of travel loop, they may be subjected to remote comparison with target individuals whose data is contained in a database of targeted individuals and thereby again being compared with their first seen and last seen condition biodata.

Comparisons in this manner allow for the inclusion of a baseline biodata for the individual's condition, against which they may be compared with a biodata template for a suspect pandemic profile or several such profiles simultaneously. Should this three way check of the individual's now seen condition biodata with his/her respective first seen and last seen condition biodata reveal differences, then he/she may be segregated for further confirmation of his/her suspect changed condition without further endangering other travellers or the officials operating this system. In this way, large numbers of travellers in crowded conditions, such as major train stations and airports, can be reviewed pro-actively against their own base line data and variations can be noted against templates or known condition changes that are specific to any suspect or actual pandemic.

Technology in transient privacy is enduring. Individuals need an operating system that will enable them to practice personal privacy hygiene in their everyday electronic life. Linked commodity software or combinations of commercial, off the shelf software will not provide this solution because of built in vulnerabilities, but this methodology, wherein all entities are treated as individuals with their own unique description and encryption key, as are all authorized system operators that meet a biometric challenge before they are issued their individual specific session key, will be deemed necessary.

This methodology allows for the creation of identity management by linked multiple (by choice) privatized entities and provides the foundation for a new generation of safe and secure computers which are required to handle private data. This methodology also removes the profit motive from Electronics Manufacturers that make 'counterfeit' electronic products or equipment, in that any such Counterfeit product would be unusable within this invention's method of operation.

Identity is not just about human individuals. It is the set of distinguishing characteristics and attributes of any given entity, regardless of whether it is a private or government entity. Once this identity is established, it can then be incorporated into policies across all individual identities, human or otherwise. Thus a company can provision its staff with the appropriate devices and privileges, and set organization policy, dictating the extent to which devices and staff have access to resources, while making assets and inventories visible across all allowed organizations. Normally, the data being managed in an asset and/or inventory management system can not "talk" to identity management systems, but they will have that capability within this secure, reverse accountable invention.

Some of the drivers affecting businesses and governments today are regulatory compliance with, for example, the US Visa Waiver Requirements, security and increasing productivity. While, in general, companies will invest in productivity increases, they, in general, will avoid investing, or invest the least possible on the security measures that will facilitate meeting the compliance requirements if inspected or called to account by way of government audit. In the absence of in-built identity, these problems conflict with each other. This invention solves this by an identity based methodology that is the foundation of a new computer operating system model that provides, in one secure, network centric operating system, the security levels needed to be interoperable within corporate to government to private individual operations. The ability to easily manage those identities—whether they are individuals, assets, system components, data or other resources, increases safety in medical delivery, transport systems, national critical infrastructure productivity and will simultaneously provide government and businesses advantages, both in increased efficiency and in pro-actively detecting and preventing adverse outcomes and criminal attacks of any nature, including terrorism.

Tight integration of identity computing into other products, human individual system operators and customers or travellers will improve ease of use. It will also enable pre-built components so that applications and services can be easily identity enabled in development, as well as defining models to allow users, national user groups and identity enabled international common user groups, the quick deployment of trusted network centric identity computing for common environments.

For example, modular platforms designed to facilitate the deployment of trusted web-services will make applications identity-enabled and interoperable in any network in which they are employed. Identity management using an identity-driven computer operating system is the intent of this invention and is more complete. It replaces the traditional people and passwords with identity driven computing that includes or expands to any government or corporate asset, piece of data, and computerized process. For example, by treating a wireless enabled computer device as an identity and a human individual and the information on the device as identities in like manner, individual specific access control is achieved.

Integrated, identity based modular platforms facilitate security as task stacks that may combine open source and commercial software. The foundation of identity and security components, allow government agencies and corporations to deploy secure identity based operating system components as a complementary set of technologies that allows verifiable and accountable web-services and/or radio transmission (such as WiFi) based applications.

DETAILED DESCRIPTION OF THE INVENTION

In order that this invention may be more readily understood and put into practical effect reference will now be made to the accompanying drawings which illustrate a preferred embodiment of the invention and wherein:

FIG. 1a is a pictorial representation of an identification card according to the invention;

FIG. 1b is a pictorial representation of another identification card according to the invention;

Figure 2A:
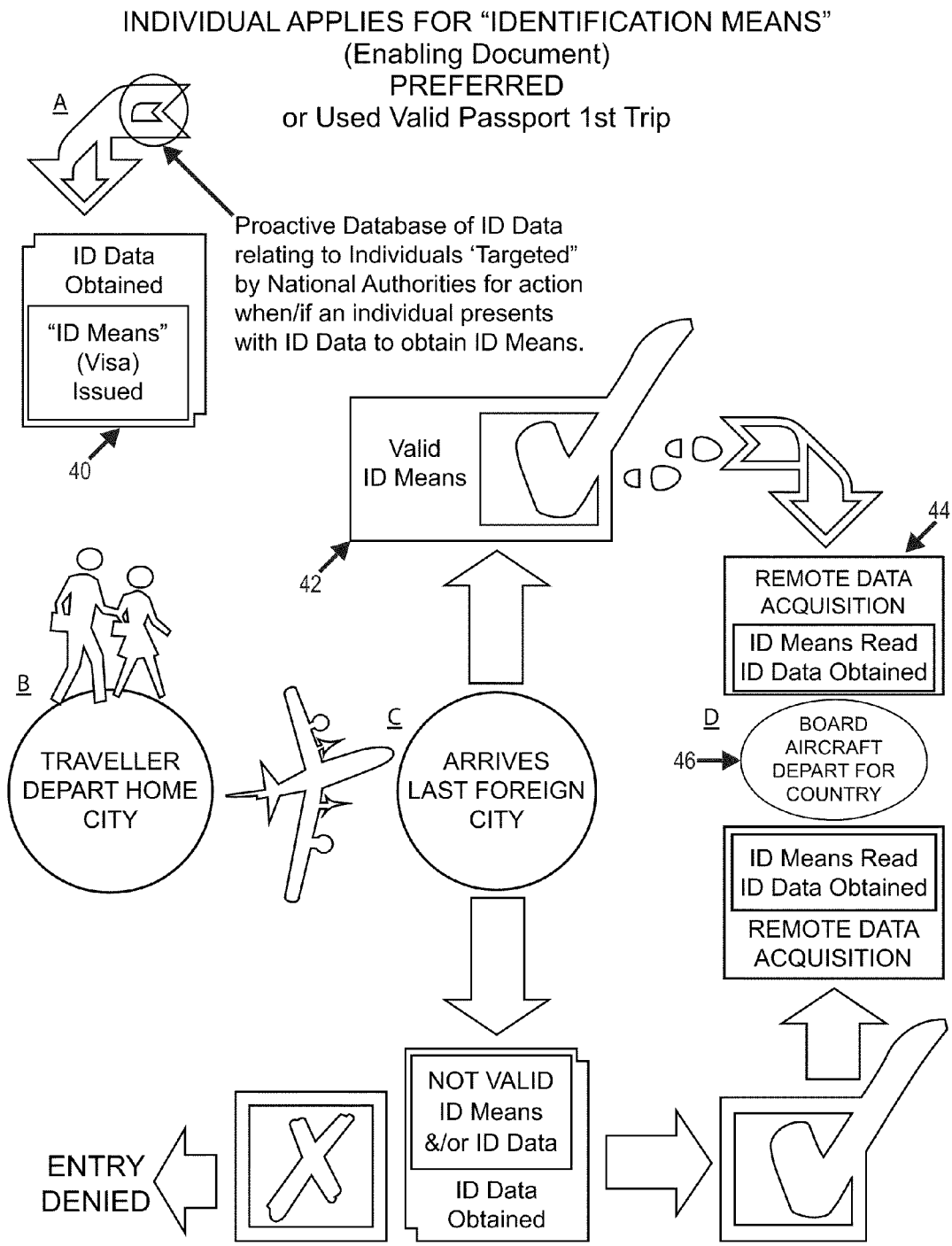
Figure 2B:
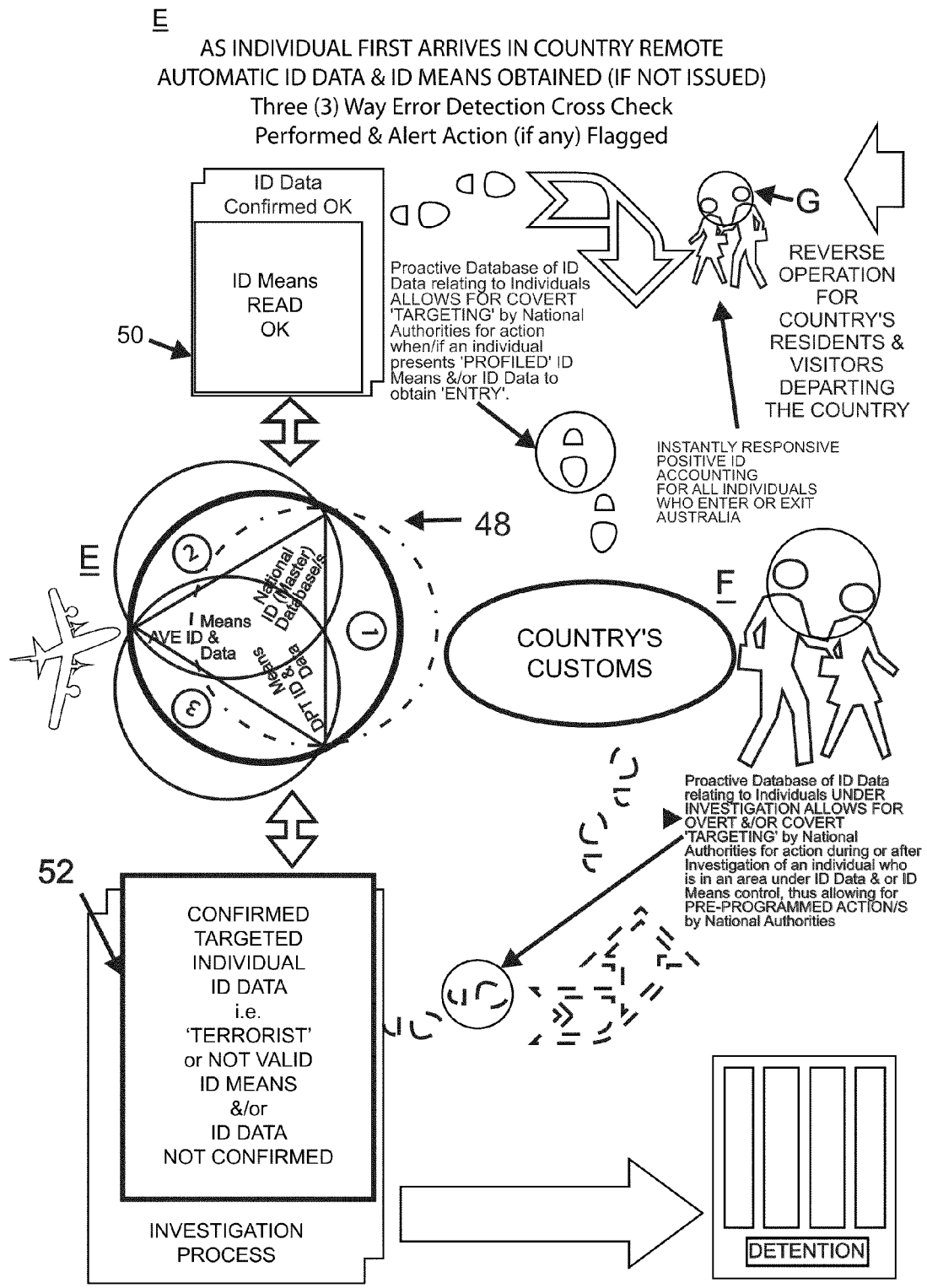
Figure 3:
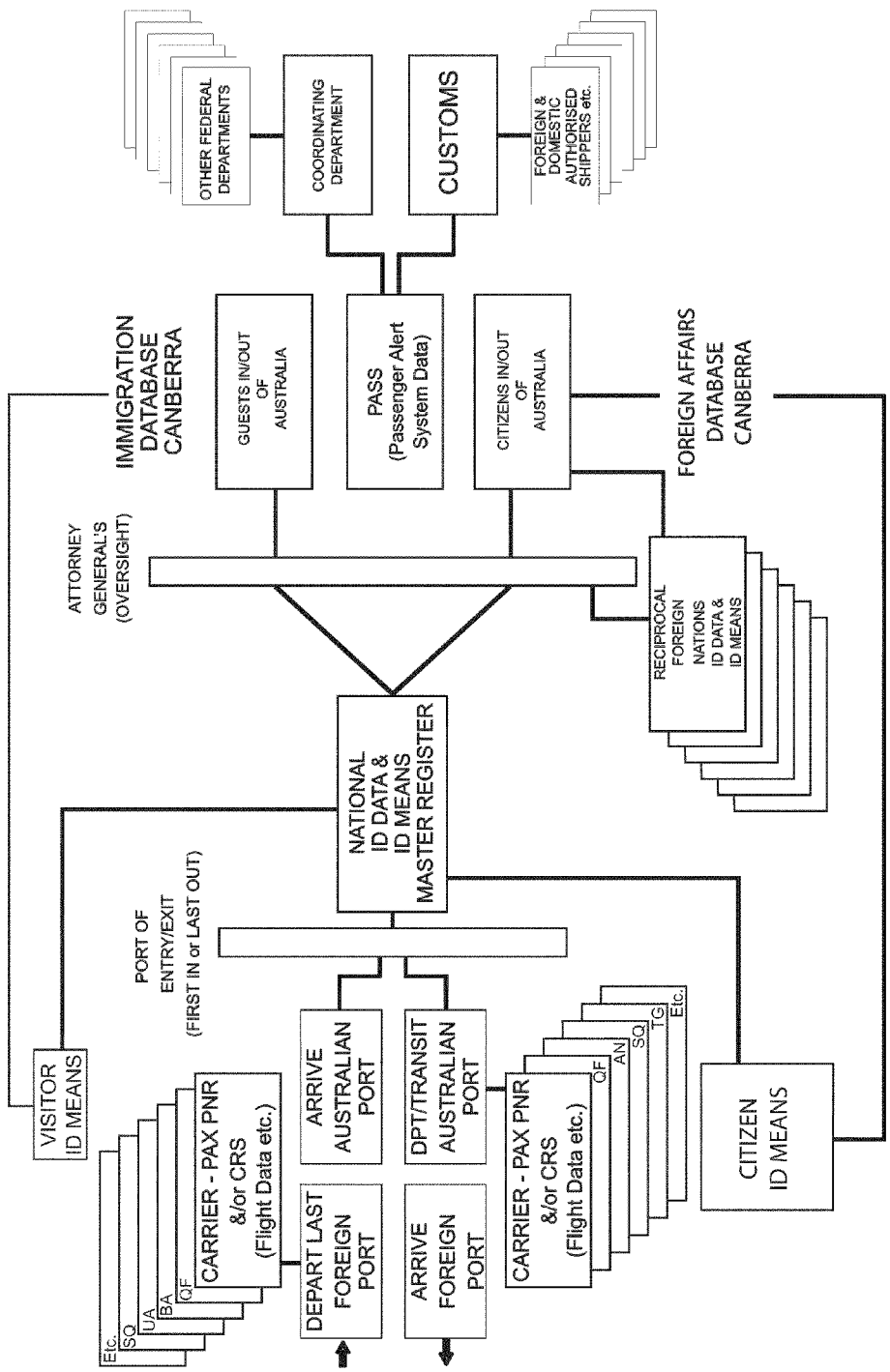
Figure 4:
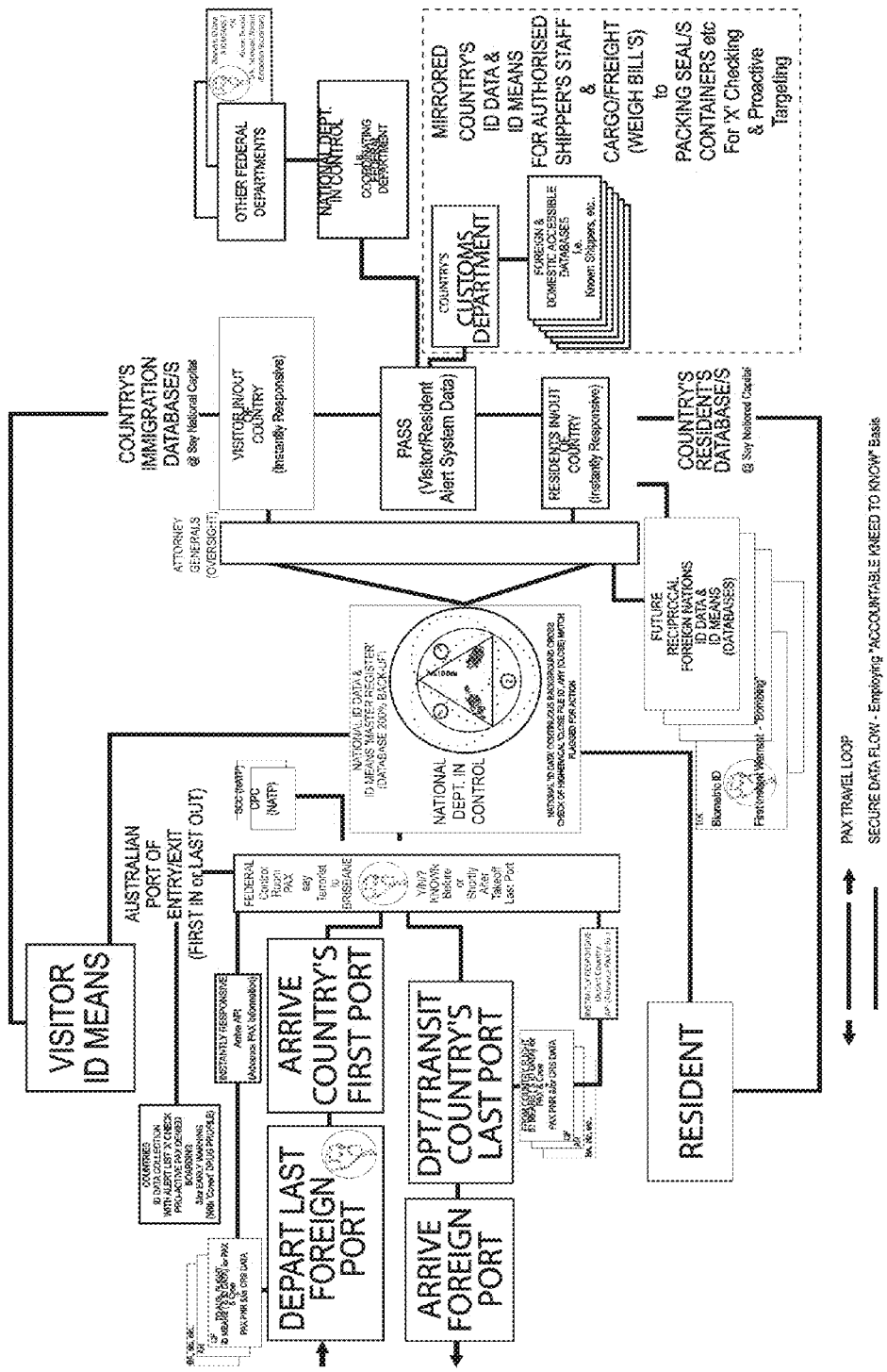
Figure 5:
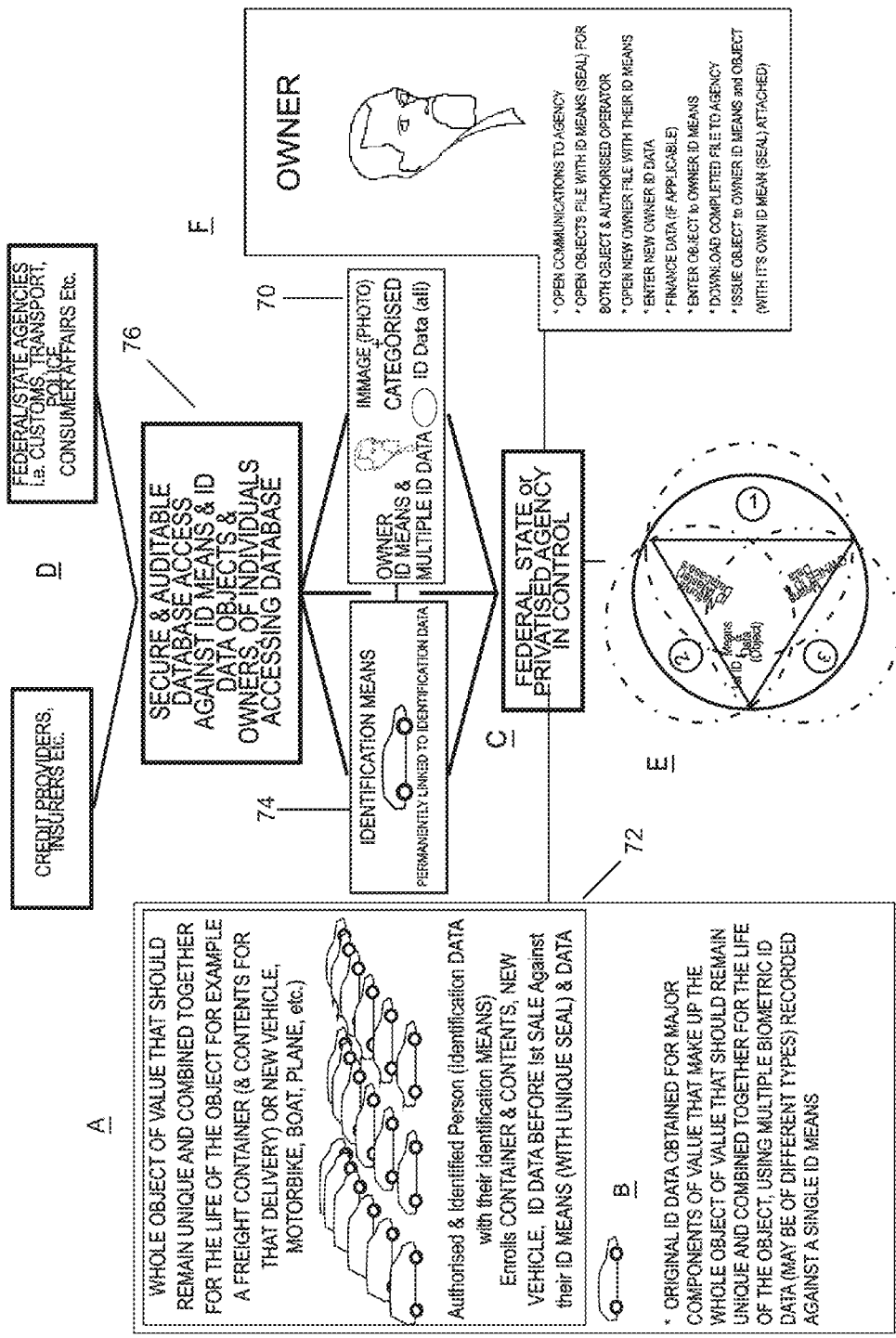
Figure 6:
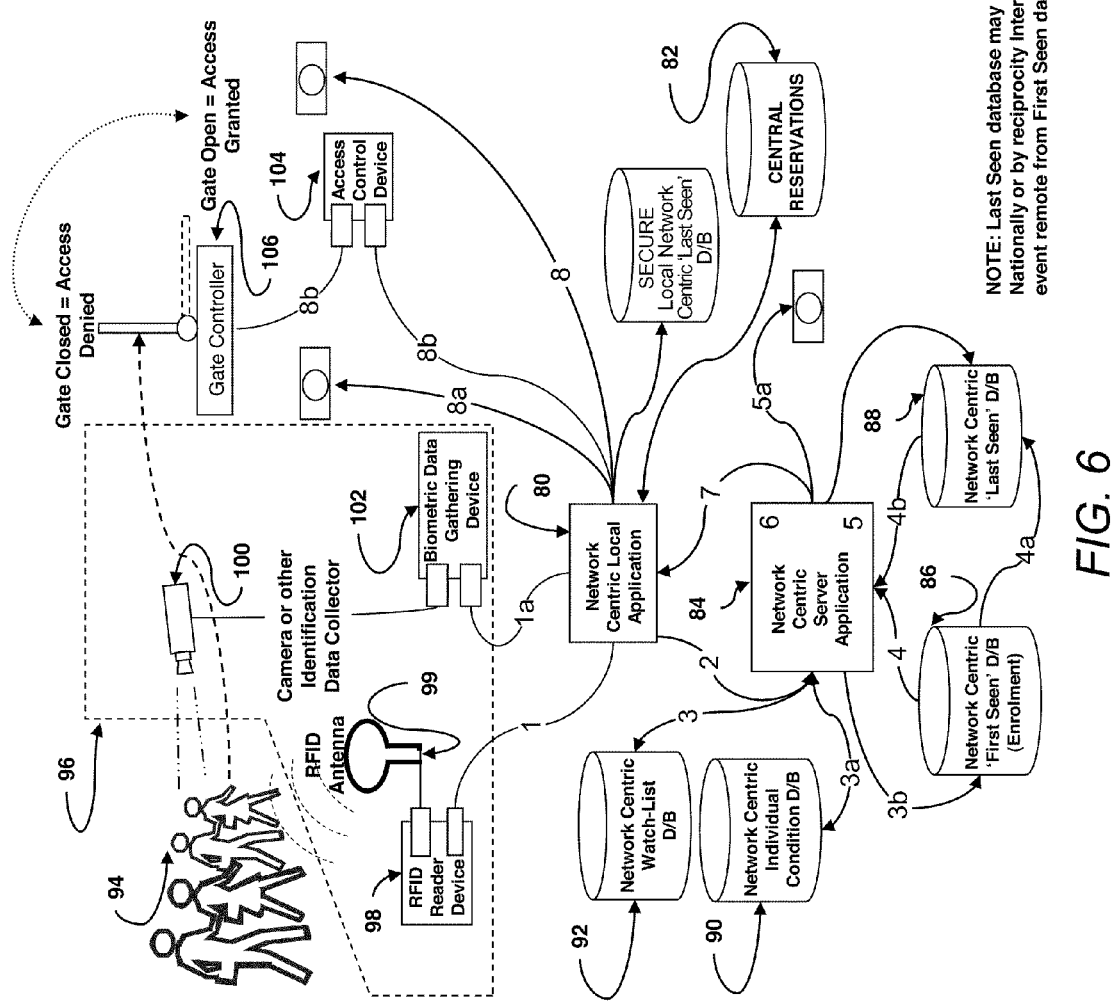
Figure 7:
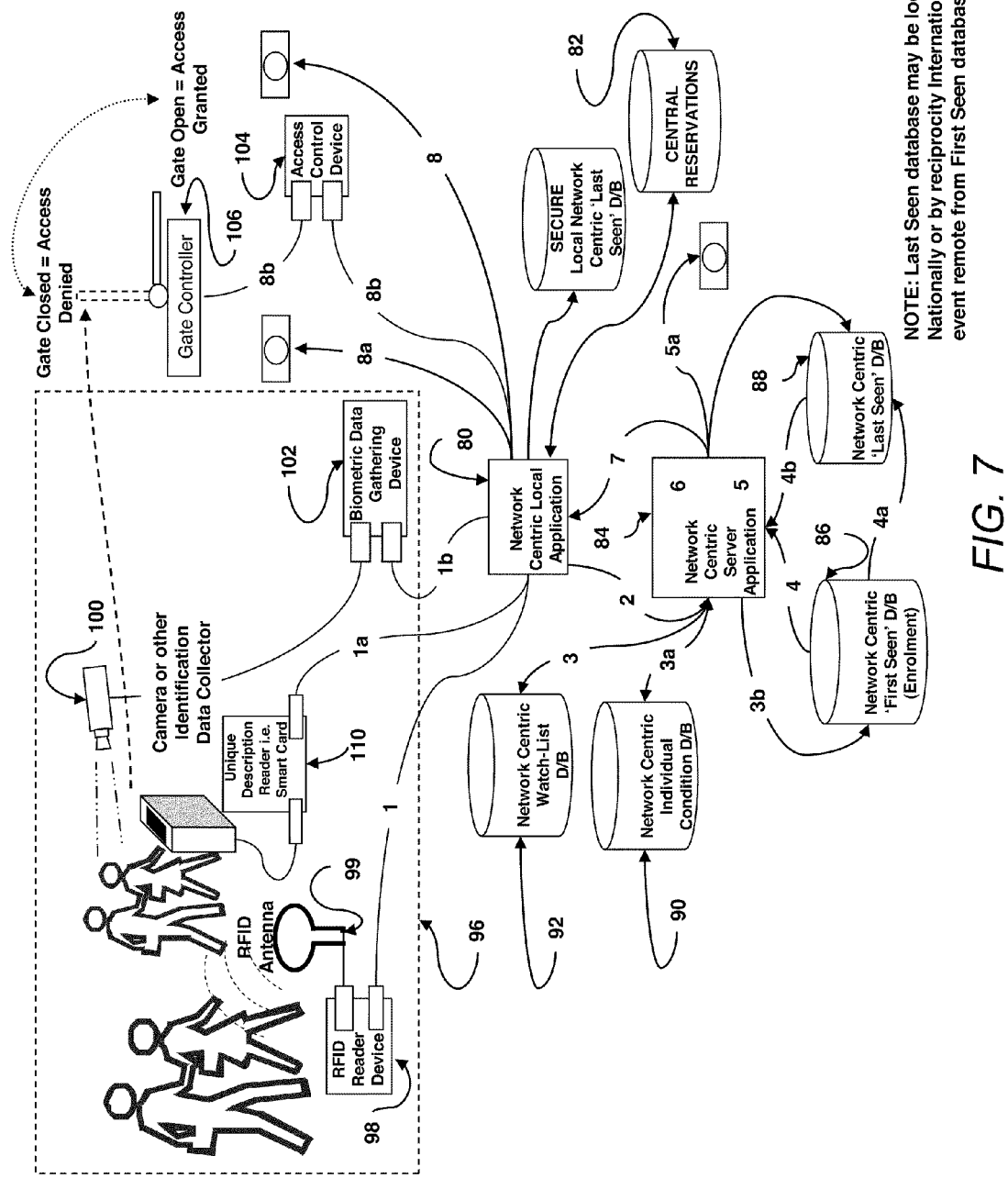
Figure 8:
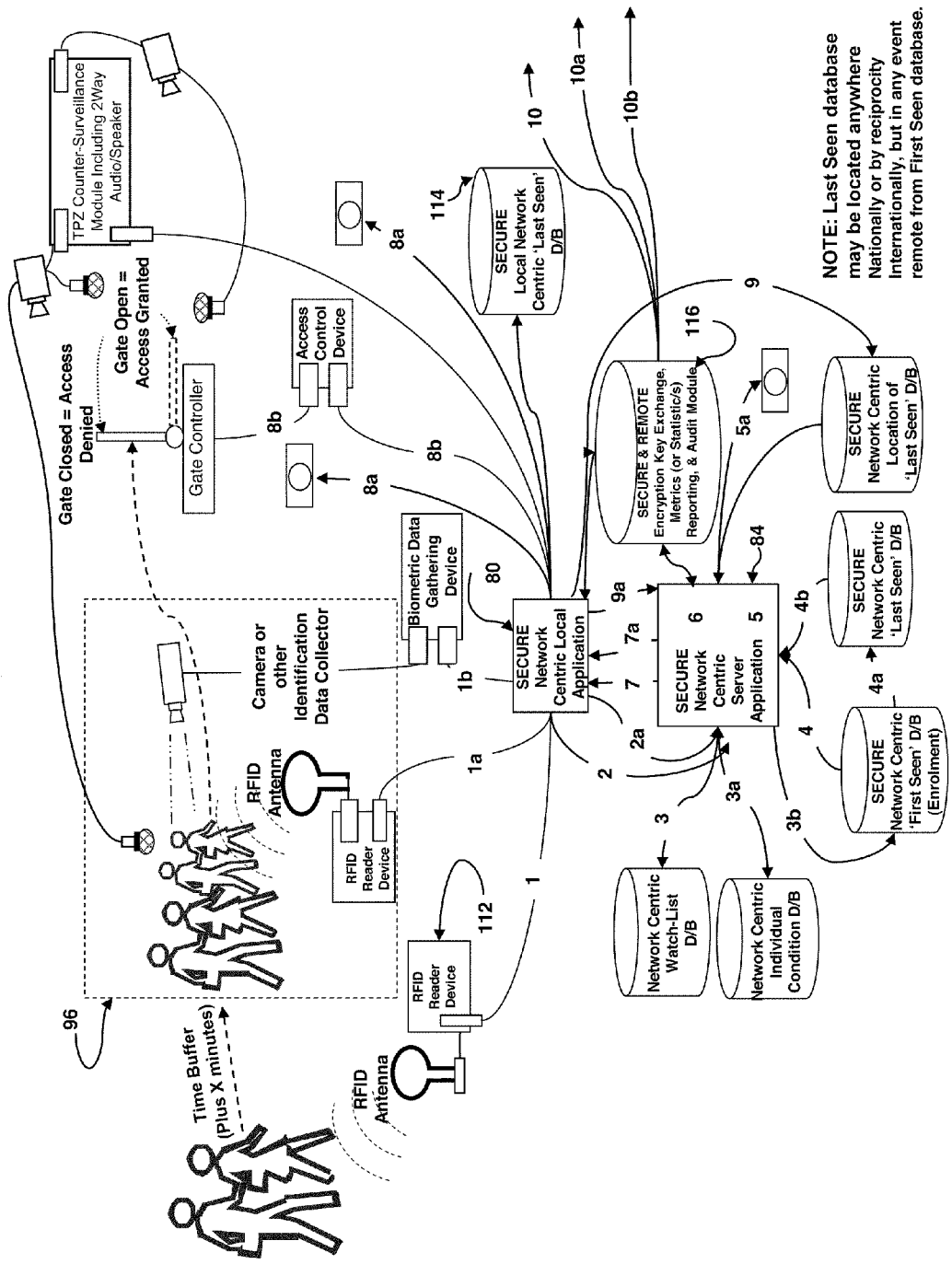
Figure 9:
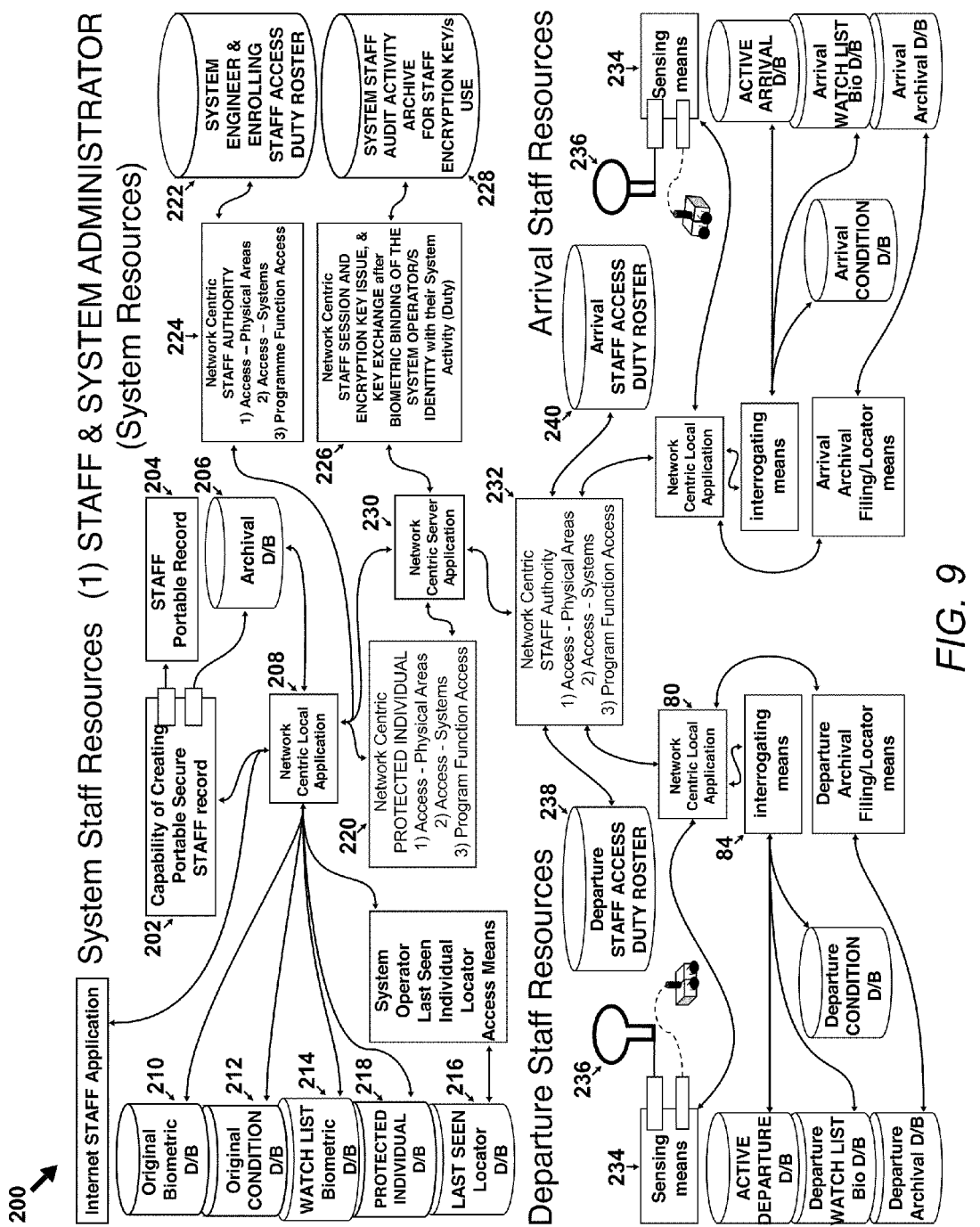
Figure 10:
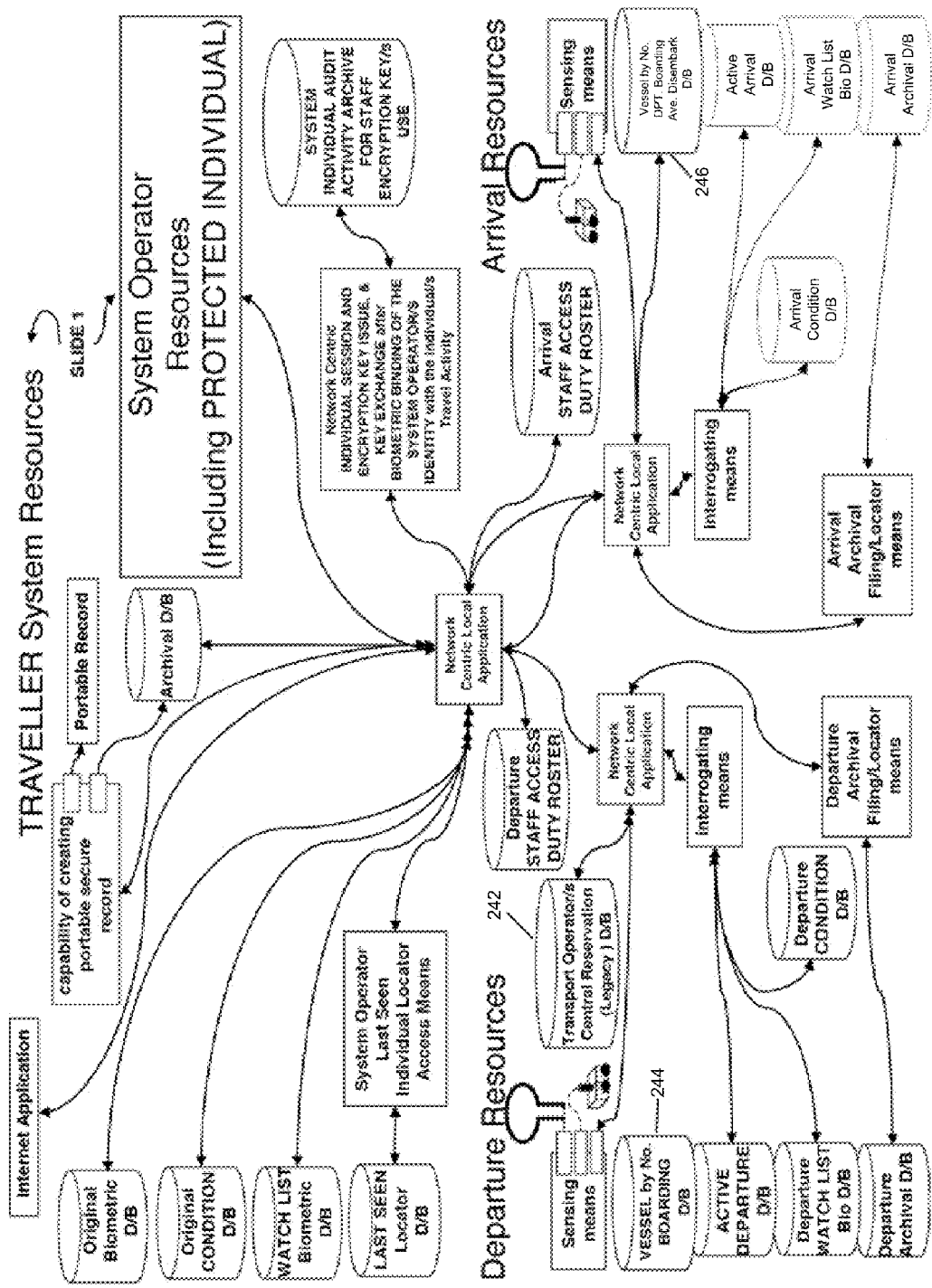
Figure 11:
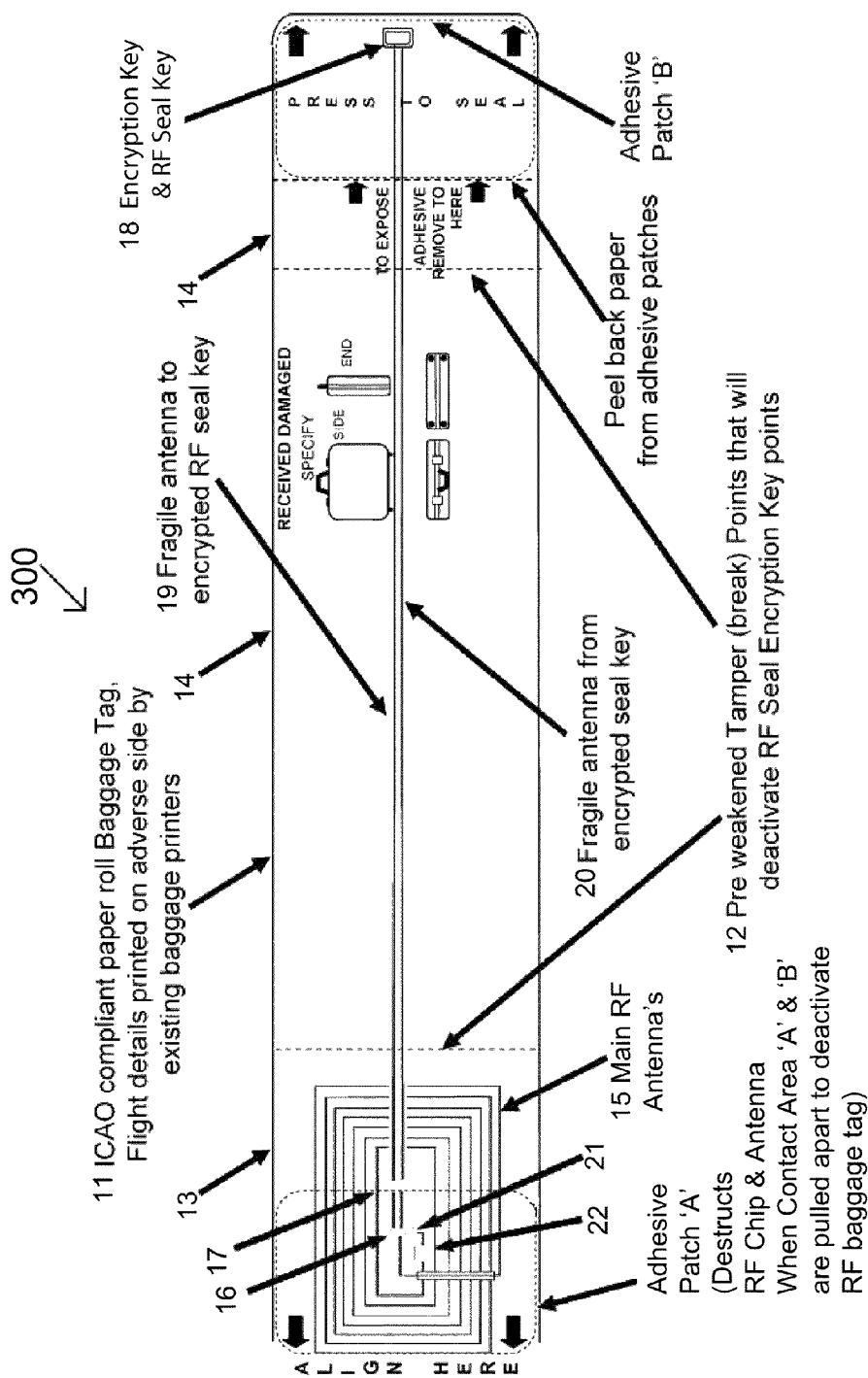

FIG. 2, including FIGS. 2A and 2B is a diagrammatic representation of a method of facilitating travel of authorized persons according to the invention;

FIGS. 3 and 4 are diagrammatic representations of the interconnection of relevant functional areas and databases for the implementation of a system according to the invention;

FIG. 5 is a diagrammatic representation of a method of facilitating movement of motor vehicles according to the invention;

FIG. 6. is a diagrammatic representation of a verifications system at transit point;

FIG. 7 is a diagrammatic representation of the verification system of FIG. 6 with added features;

FIG. 8 is yet another diagrammatic representation if the verification of FIG. 6, with additional added features;

FIG. 9 is a diagrammatic representation of a verification for staff and administrators of a verification system;

FIG. 10 is a diagrammatic representation of a transit point with verification of all users and operators of the system;

FIG. 11 is a view of a baggage tag according to the present invention; and

Figure 12:
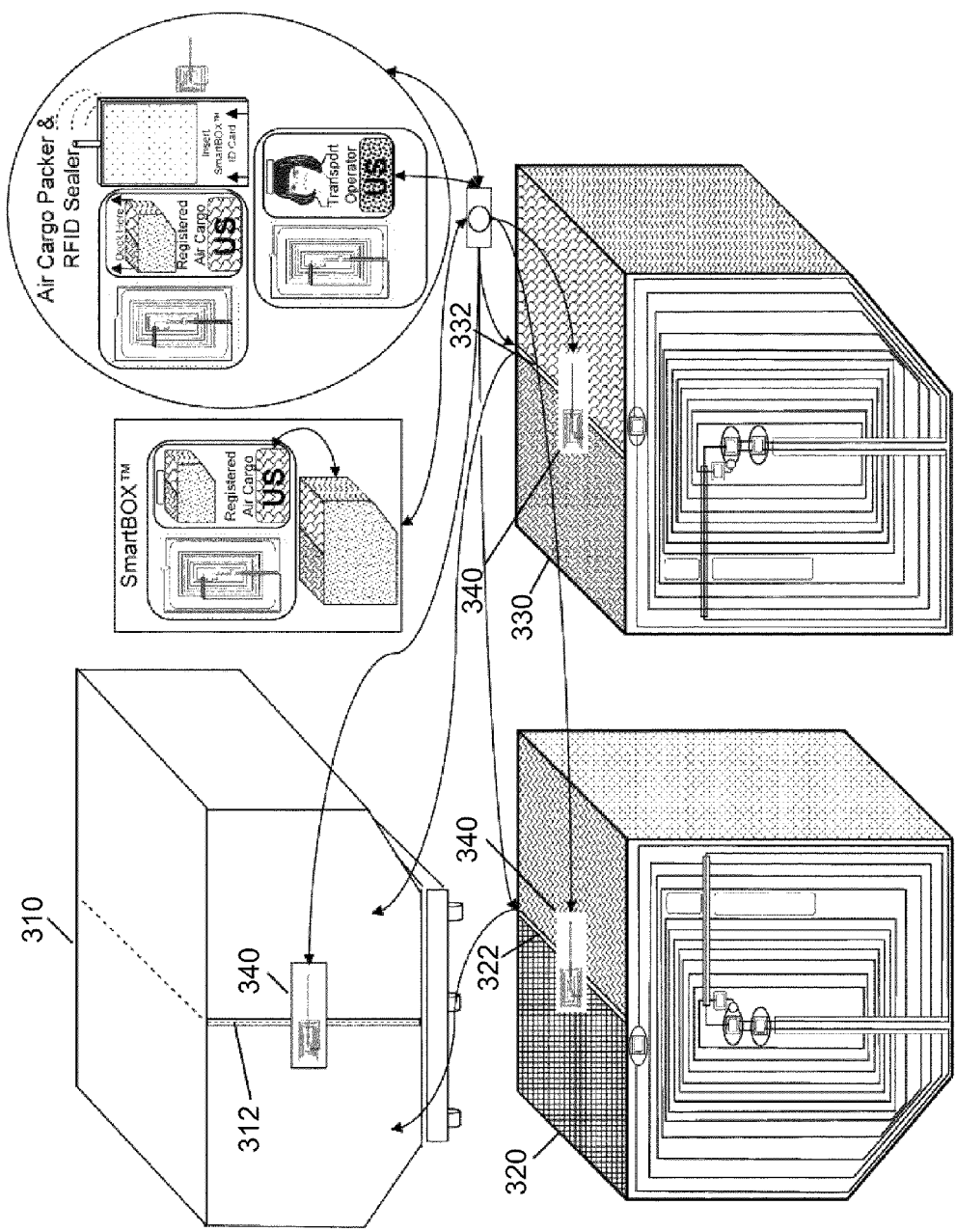

FIG. 12 is a representation of a cargo application of the verification system of the present invention.

The radio frequency responsive identification card 10 illustrated in FIG. 1a includes a wallet sized flexible plastic base layer 11 foldable about a centrally located fold line 12 which divides the card into an information portion 13 and a validation portion 14. The information portion 13 includes a circuitous antenna 15 embedded in the base layer 11 for receiving signals. The antenna 15 is operatively connected to an entry transponder 16, a description transponder 17 and a validation transponder 18. The validation transponder 18 is located on the validation portion 14, the connection thereto passing across the fold line 12 by conductive tracks 19 and 20. A time delay component 22 is arranged to create a time delay between receipt of a radio frequency signal and transmission of a responding signal.

The transponders 16, 17 and 18 are arranged to report in sequence in response to a radio frequency signal transmitted from an adjacent transmitting and receiving station The entry transponder 16 includes an entry key component 22 which is configured to transmit a reader station access code to the receiving station, thereby alerting the receiving station of a valid signal part. The receiving station is thereby prepared for receiving further signal parts from transponders 16, 17 and 18. The component 22 effectively prevents the receiving station processing any signal which does not begin with the access code. The transponder 16 also contains information in respect of which database contains the individuals identification file.

The description transponder 17 is an integrated circuit which transmits a signal indicative of the unique description assigned to the individual to whom the card was issued and an identification of the issuing station which issued the card. The description transponder 17 transmits its signal directly after transponder 16. The transponder 18 is an integrated circuit containing a validation and encryption code. The encryption code is unique to the card and cooperates with the file location code such that the signal recorded by the receiving station is a parcel of information with a unique identifier which must be decoded by corresponding decoding means associated with the receiving station.

The radio frequency responsive identification card 10 illustrated in FIG. 1b includes components as described in respect of FIG. 1a. However, in this embodiment the validation portion circumscribes the information portion wherein the conductive tracks 19 and 20 effectively surround the antenna 15. In use, the transmitting and receiving station typically located at both the departure station and the arrival station, transmits an empowering signal at a particular frequency for a predetermined period of time. All cards operating at that frequency and within the designated range or zone, such as by being carried by a single individual, may be activated by the empowering signal.

The identification card is activated by the signal but, unlike the other cards, does not respond immediately because of the in-built response time delay. The length of the time delay is set to allow sufficient time for all cards likely to be activated at the same frequency to transmit their messages so as to allow a signal subsequently transmitted by the identification card to be identified and received clearly and uninterruptedly by the receiving station. At the end of the designated time delay the entry transponder 16 transmits its signal to the receiving station which then prepares to receive a message signal from the description transponder 17 and a validation signal from the validation transponder 18.

If the validation signal is received as expected the encryption code encompassed in the signal transmitted by validation responder 18, cooperates with the messages from transponders 16 and 17 to create an encrypted message which is received as a parcel of ready to send information by the receiving station. If validation transponder 18 does not respond or indicates a discrepancy in the signal from the description transponder 17, then the message transmitted by transponder 17 is unable to be encrypted by the unique encryption code carried by the responder 18. However, the message is subsequently encrypted by an encryption code specific to the particular receiving station reading the card. Accordingly, the message is prepared as a flagged parcel of information providing an indication that the individual requires further investigation.

Figure 1C:
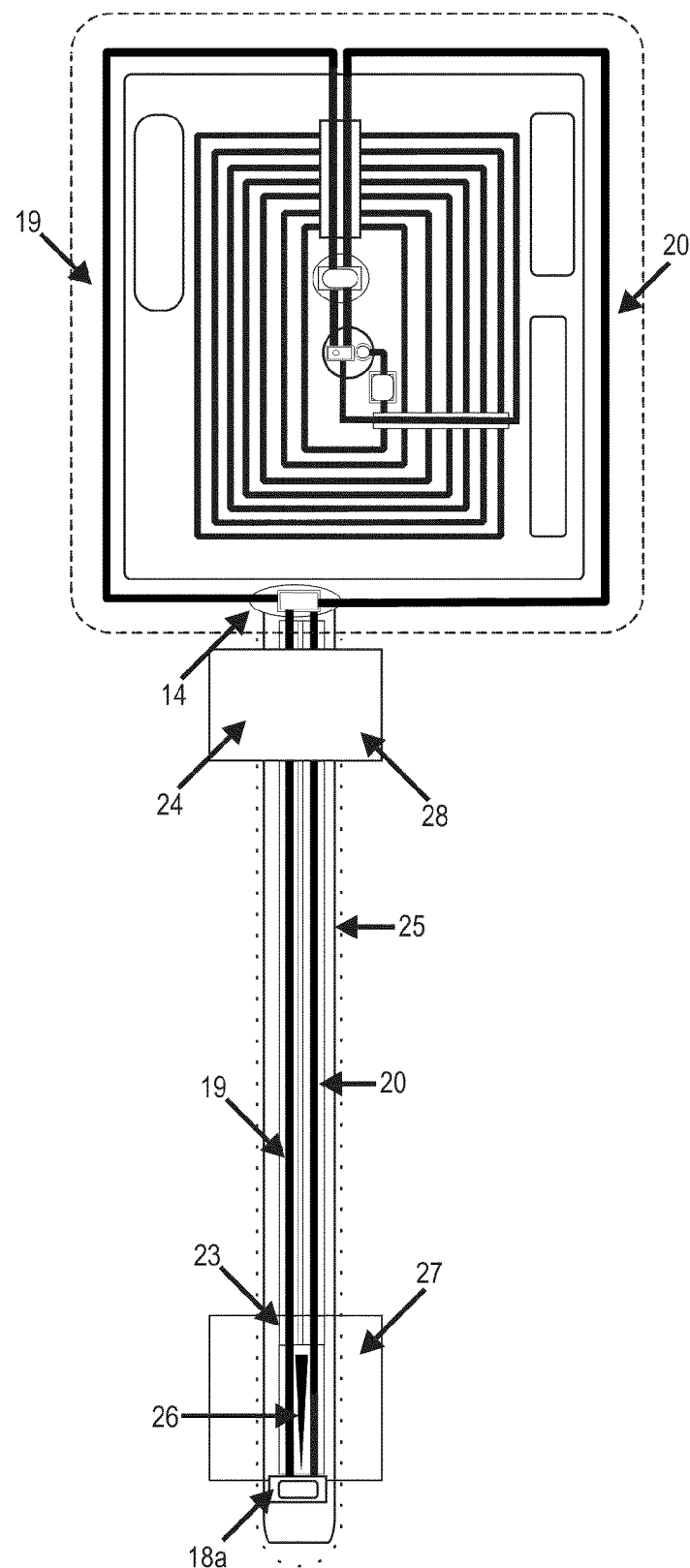
FIG. 1c is a pictorial representation of a container seal according to the invention.

FIG. 1(c) illustrates a seal for a shipping container incorporating the card of FIG. 1(b) in pursuance of the method illustrated in FIG. 5. A failure of the validation responder or a discrepancy in the signal from the description transponder 17 will indicate that the seal assembly has been removed or broken and that the container has possibly been accessed. It will be appreciated that the seal is a "use only once seal". For this purpose the seal includes a looping strip 27 for looping to the container door and which is received in the knife edge slot 26. A similar looping strip 28 is provided for looping to the container body. Any attempts to open the door will damage the conductive tracks 19 and 20 or the validation transponder 18a. In an alternative embodiment the looping strip 28 is replaced with a saddle including a slot similar to slot 26 and the connector strip 25 may pass through the slot 26 to lock about the container door and the container body.

The facilitation of travel by authorized persons is illustrated schematically in FIGS. 2, 3 and 4 and is described hereinafter. Persons wishing to travel internationally apply for and are issued an identification card of the type described above. The card is issued by a card issuing station 40 whereat the appropriate unique description is programmed into the card. Either at the same time or subsequently, the biometric data of choice unique to each person and suitably a thermogram is prepared and stored (preferably in digital form) in the database of the file holding station at a file location designated by the unique description. The thermogram is suitably of the type described in U.S. Pat. No. 5,163,094 to Prokowski.

The individual may subsequently indicate a desire to travel to Australia. Such a desire for example, may be indicated by the purchase of an airline ticket or making an application for a visa. The individual's identification card may be read 42 at this time and the airline ticket would be issued in the name of the person to whom the card was issued. At this time the individual's add-on file in the national database would be updated to show that he is authorized to travel to Australia and remain there for a specified period of time. Upon updating of his add-on file the individual may be issued with a suitable receipt or ticket for his own benefit and record although such a receipt would not be used for any official purpose.

In a preferred embodiment the individual's thermogram or other biometric data is retrieved from the database or prepared at this time and stored in a departure station database arranged to collate thermograms in respect of individuals ticketed for each particular flight. Accordingly, information specific to each person as well as information in regard to authorized length of visit and the like or other information enabling quick and easy access to that information in respect of each person on a particular flight is prepared as a packet of identification data prior to the time of departure.

As passengers move towards the departure lounge or through the departure gates, for example, they are scanned by a remote scanner to create a contemporary thermogram which may be instantly compared with the thermogram previously loaded into the departure station database to positively identify each passenger. Those passengers positively identified 44 as authorized passengers by a sufficient correlation between the contemporary thermogram and the departure station database thermogram are afforded an uninterrupted passage to the departing aircraft 46. Those passengers in respect of whom the correlation is below the requisite level are directed to a designated area for further identification. This process is carried out for all persons boarding the aircraft. The departure station may also maintain a database of prohibited persons which preferably is accessed for comparison with all passengers. Any person who is identified as a prohibited passenger may be prevented from boarding the aircraft.

With respect to FIG. 2B, at the same time or timely during the flight, the packet of information data containing all of the passenger data is transmitted to the destination station where it is stored in the destination station database. As the individuals arrive in the country, a three way error detection cross check is performed in element 48 wherein the current information of arriving passengers is available for a comparison. First, the national data is compared to the departure data (DPT), the national data is compared to the current arrival data (AVE) at (2) and, at (3), the arrival data (AVE) is compared to the departure (DPT) data transmitted from the departure point. Those persons not positively identified in the short period before boarding and allowed to board are investigated further during the relatively long period in which the aircraft is in transit. Accordingly, those passengers for whom authorization is eventually established are provided with easy entry 50 to the destination airport and those who have not been positively identified are detained 52 for further identification.

At the destination airport all passengers proceed past a scanning station where each passenger's identification card is read remotely, thereby enabling the stored thermogram for that card to be retrieved. Each passenger is coincidentally thermogrammed by a remote thermographic scanner focussed on the person carrying the sensed card. The thermograms are compared and where a sufficient correlation is achieved such persons progress to their destination without further interruption by officials through selection gates which may be actuated by the monitoring equipment automatically.

Suitably the selection gates unobtrusively capture unauthorized individuals for safe further investigation. The add-on database may be updated at this time automatically to record the arrival of each passenger in the destination country. Alternatively, the departure airport may package the information contained on the identification cards of individuals on a flight and send this to the arrival destination which compiles the packet of identification data for their use to facilitate free passage of bona fide disembarking travelers.

Preferably each station which can access the database has an individual station access code and each operator manning such a station has an individual operator's code. Suitably this information is added to the add-on only file each time an access is made or attempted. Suitably, authorization to access the database is provided in a similar manner wherein biometric correlation is required. Accordingly, an audit trail of actions is maintained and a log of authorized movements of each individual is recorded in such a manner that a history report including details of the operator updating the file can be established.

Foreign travelers in a host country need only carry their identification cards. If queried as to whether they are authorized to be in the particular country, they only need to accompany a government official to a reading station where a contemporary thermogram can be taken and where their identification cards can be used to access the national database to retrieve each individual's thermogram and authorized travelling particulars. These process steps are broadly indicated in the diagrams of FIGS. 2-4, in varying degrees of detail.

In addition to the foregoing this invention could be used to monitor individuals entering and exiting a secured area such as border crossings or prisons. Furthermore, the method of providing identification may be utilized to establish the identity of persons undergoing medical treatment. For example, the database may include information in regard to medical condition, blood group or the like and such information may be utilized by hospital staff upon receipt of confirmation of an injured person's identity rather than performing on the spot blood tests to determine that person's blood group. Advantageously, such method will save time. Alternatively, a medical practitioner could prescribe drugs or treatment to a distant patient upon establishment of the patient's identity by the foregoing method, secure in the knowledge that the person's identity has been correctly established.

The facilitation of movement of shipping containers or motor vehicles is illustrated schematically in FIG. 5. The term biometric data as used in relation to the freightable articles means an identifiable attribute specific to the article such as a surface image. Entities wishing to export on a regular basis will be required to make application to become authorized exporters. On approval of such application all personnel employed by the authorized entity will be issued with a personal identification device 70 as previously described.

Information in respect of the preparation, packaging and contents of individual parcels to be shipped in a shipping container will be entered into the add on file in respect of that particular container, which will be identified according to the method previously described 72. Upon closure, the container will be sealed with identification means 74 such as a seal assembly as previously described which has been issued to the authorized entity by an official issuing authority. Details of the seal will be entered into the database 76 and married with the identification data in respect of the container as an add-on file. If the container is a non-identified container, then the seal details will be married with details of the shipping entity. The same process will be carried out by all authorized exporting entities.

Containers arriving at a shipping station will be remotely scanned to check for any unauthorized access to each container between the dispatching station of the exporting entity and the shipping station and also for any damage to the seal. Information in respect of all containers to be loaded on a particular ship will be compiled to form a package of data which will be transmitted to the destination port At the destination port the containers will be unloaded and scanned automatically to determine if the seals have been damaged. The seals and the identification data will be compared with the transmitted packet of data. Visual checking to determine whether the containers have been entered by removal of a remote wall panel of the container may also be carried out. A plurality of sealing assemblies may be applied to suitable parts of the container if necessary.

Those containers positively identified (i.e. with a suitable correlation between the transmitted data and the data obtained at the destination) and having the seal intact, (that is the seal sends a valid signal), will be directed from the destination port without further checking. However, those containers which are either not positively identified or whose seal assemblies do not provide a valid signal will be directed to a checking station for further investigation. By use of this method freight forwarded by bona fide exporting entities will be afforded an uninterrupted passage unless an unauthorized party has gained access to the container during shipment or a seal has been accidentally damaged. The method therefore is expected to improve the efficiency of freight movement.

Turning now to FIG. 6, there is illustrated, in diagrammatic form, a walk past process according to the invention using contactless radio frequency identification means. Before the process starts, the local application unit 80, at midnight, local time (or any other suitable time), requests and receives from transport operator's central reservation server 82 all the passenger data to be processed within the next 24 hours. Local application unit 80 receives data in packets according to departure and arrival times. A request for ID Data is made to a network centric server application 84, which sends inquiries to a "first seen" (or enrollment) database 86, a "last seen" database 88, an "individual condition" database 90 and a "watch list" database 92. The server 84 collects the information including a pro-active alert "warning flag" in advance of the arrival of individuals 94 at an entry data collection station 96. The local application device 80 updates this data regularly throughout each 24 hour period.

When an individual approaches the data collection or access point 96, a radio frequency identity detector (RFID) 98 detects the individual's identification device and cameras 100 and other biometric data gathering devices 102 devices record the individual's respective biometric data. The local application unit 80 associates the card unique description, with one or more pieces of noninvasively obtained biometric data of card holder.

The local application unit 80 passes card unique description and biometric data to the network server 84 for comparison. The server application unit 80 requests a search of the watch list database 92, and the condition database 90 for any match or close match of data collected from the RFID reader 98 and the biometric data gathering device 102. The result of any match sends appropriate flags to appropriate authorities. Further, the server application unit 80, on receipt of data from the RFID reader 98 and the biometric data gathering device 102, also requests the linked biometric data from enrolment or first seen and last seen databases 86, 88.

The first seen database 86 passes back recorded biometric data and authorizes the last seen database 88 to pass back last seen recorded biometric data to the server application 84. The "last seen", and "first seen" biometric data are compared to validate the integrity of the first seen and last seen databases 86, 88. Any failure to reach required comparison threshold causes an alert to be transmitted to internal security. The first and last seen data are held until current data is received from the biometric data gathering device 102.

Current-seen, last-seen and first-seen biometric data are compared and if identity is confirmed, an enabling signal is sent to an access control device 104 which enables a gate controller 106 to permit passage or access Similarly, if identity is not confirmed, the signal to the access control device 104 results in a different signal to the gate controller 106 and access is denied.

If three way biometric data comparison is inconclusive, the an appropriate signal is sent to the local application unit 80 and either a request is made for more biometric data or, if a threshold has been reached, a decision can be made to deny access and flag for additional evaluation, which may be a manual investigation. In such an event, the local security detachment is advised and a law enforcement official may be instructed to deny access and possibly detain the individual.

FIG. 7 illustrates a walk past process according to the invention using contactless RFID as in FIG. 6, above and a smart card reader 110. As in the system of FIG. 6, the server application unit 80 is initialized and receives data from the same databases and sources. When an individual approaches the access point 96, one of three possible scenarios start:

1) Identification means are carried by the individual through the RFID antenna 99 reading area, wherein the RFID reader device 98 detects the individual's identification means and cameras 100 and other biometric data gathering devices 102 record respective biometric data; or
2) Identification means' surface is presented "on the fly" to the unique description reader device 110 wherein it detects the individual's identification means. The cameras and other devices 100 record respective biometric data; or
3) The identification means carried by the individual contains both an RFID micro processor and a surface mounted unique description. Under this scenario, scanning may be conducted overtly or covertly, as well as the individual presenting the dual format identification means to the unique description reader device 110 wherein it detects the individual's identification means and the cameras and other devices 100 record the individual's respective biometric data.

The local application unit 80 associates the retrieved RF Card Unique Description, and/or smart card, with one or more pieces of noninvasively obtained biometric data of card holder. Local application unit 80 passes the card unique description and biometric data to the several servers for comparison. The server application unit 84 requests a search of the watch list database 92 and the individual condition database 90 for any match or close match of the data collected from the individual as in FIG. 6. As in FIG. 6, the response is categorized As before, server application unit 80 requests the linked biometric data from enrolment or "first seen" and "last seen" databases 86, 88.

The first seen database 86 passes back recorded biometric data and authorizes the last seen database 88 to pass back last seen recorded biometric data to the server application unit 84. Last-seen, and first-seen biometric data are compared to validate the integrity of the first seen and last seen databases. Failure to reach required threshold causes an alert signal to be sent to internal security personnel. First and Last-seen data are held until the current data received from the access point 96 data collection devices. Then, current seen, last-seen, and first-seen biometric data are compared. If the three way comparison of the biometric data match, that result is communicated to the local application unit 80. In the absence of a match, more biometric data can be requested, or, if a threshold value indicated that the data do not match has been reached, either the is an instruction to deny access or, alternatively, to flag for manual evaluation. In this event, internal security or law enforcement officials can be advised and the access control device 104 is instructed to deny access.

FIG. 8 illustrates the system of FIG. 7 to which has been added a separate validation system for assuring the identity and validity of all equipment and system operators to whom encryption keys are allocated. For this embodiment, thermal cameras are deployed to detect; a) facial or other Disguise/s that an individual may employ in order to impersonate another authorised Individual, (b) Changed medical condition away from a baseline established on enrolment and all ensuing last seen records of their established status, and a covert and/or Overt Counter surveillance system that is Network Centric enabled.

When an Individual approaches, the Access Point 96, RFID detects the Individual's Identification Means and cameras and other devices record the individual's respective biometric data. By using an advance local application RF reader 112 of card's unique description for tamper detection, substantial advance processing time is afforded if tampering is detected. Where no tampering is detected, the detected description reachers the server in well in advance of regular data collectors, allowing additional time for all first seen and last seen information to be retrieved from any global location and have the local application unit 80 perform pre-cross check before the "now seen" or current identification data retrieved. On completion of the identification sequence, the local application unit 80 sends all contemporaneously collected biometric data to its own dedicated secure last-seen database 114. The local application unit 80 then advises the server application unit 84 of the new address of this individual's newest last-seen biometric data. Such biometric data collecting devices can also be utilized to apprehend an individual without an identification means but with a record in the database, including a medical condition record as a previously "unknown unknown" individual, commonly referred to as a "sleeper".

A secure and remote network centric encryption key exchange and metrics (or statistic) reporting and audit module 114, archives all encryption keys used against each piece of equipment and all system operator/s, then completes all metric measurements (or measurable activity) of actions, timings and personnel involved, including complete costings and then automatically generates governmental required activity reports as well as simultaneously generating invoices for all services performed during each operator's shift and, in encrypted form and via the trusted network centric system, submits each activity report and invoice to the respective government department and civilian operators that utilize each respective system module.

Turning next to FIG. 9, there is illustrated a system 200 for validating staff and system resources that would be employed in the systems of FIGS. 6-8. Initially, an enrolment module 202 is created which gathers both biometric and unique identification data for each member of the system staff. This data is stored in both a staff portable record 204, which may take the form of the devices shown in FIGS. 1a-1c. The data is also maintained in an archival database 206. A local application unit 208 then interrogates an original biometric database 210, an original condition database 212 and a watch list database 214 to verify the identity of the individual and to assure that there is no impediment to employment. A last seen locator database 216 is used to verify that there have been no biometric changes since initial enrollment into the national database where identity is initially established.

A "protected individual" database 218 is also checked to establish security clearances for individuals that may have been afforded protection under programs such as "witness protection" or other such programs that change or are intended to covertly morph the individual in order to prevent discovery of their true identity for national security or other reasons, so that they may have access to restricted areas and restricted assets and information in their changed or morphed identity. A protected individual application unit 220 can be used to reflect the actual assignment and access afforded a particular protected individual which can be reflected in the portable staff record 204 without any routine staff system operators' knowledge. All protected individuals' enrolment and privileges granted are handled by officials at the highest level of a multi level system, who are capable of enrolling other staff and granting initial staff access. Thereafter, such staff access is granted by an immediate supervisor on a rostered duty and area function. A protected individual application unit 220 can be used to reflect the actual assignment and access afforded a particular individual, which can be reflected in the portable staff record 204.

The responsibility for overall supervision of the system is given to individuals of proven fidelity and who have the confidence of the highest ranked administrators of the government. These individuals are listed in a system engineer and staff access duty roster and, through a staff authority unit 224 are assigned their privileges and accesses. Once staff assignments are made, a suitably encrypted key is created for each individual which is linked to the level of responsibility, the access that has been afforded and when that access can be achieved, all in a key creation unit 226. All of the information thus created is stored in a staff audit activity database 228. Through a staff network server apparatus 230, staff assignments are scheduled in a staff authority device 232

In an operation that is substantially similar bor both departure and arrival staff, the person presents a staff record to sensing means 234, which may include an RF antenna unit 236. The staff member's biometrics and unique data is obtained from the record and from the staff member and compared to the original biometric database 210, the original condition database 212, the watch list database 214, the last seen locator database 216 and the protected individual database 218. In addition, a departure staff access duty roster database 238 is checked to assure that the staff member has been assigned to this post on this shift. Similarly, the arrival staff undergoes the same process with an arrival staff access and duty roster database 240. Once identity is verified and all other authorizations are in order, the staff member takes the assigned post and awaits travellers.

In FIG. 10, the system of FIG. 9 is enhanced for the traveller by the addition of a transport operations central reservation database 242 which includes the information acquired at the time of the authorization of travel and which is sent on to the travel point in advance of the arrival of the travellers. At the departure point, there is an additional departing vessel database for the vehicle which will transport the travellers. The vessel may be a ship, a plane, a train or even a bus. Similarly, on the arrival side, am arrival vessel database 246 will contain the records of the passengers arriving on each vessel.

Turning next to FIG. 11, there is shown a secure identification device substantially as shown in FIGS. 1a-1c, but, in FIG. 11, modified to serve as a baggage tag 300. In the embodiment of FIG. 11, the tag has an adhesive coating on the obverse side which is protected by a paper (or other suitable material) layer. At one end, there is a cut in the overlying layer that enables the adhesive to be exposed so that the tag can be looped through the handle of a bag and adhered to the opposite end. The reference numerals of FIGS. 1a-1c have been used here to identify the elements of the tag 300. In alternative embodiment, the same tag can be used as a cargo seal by placing the adhesive on the reverse surface with a protective layer in place until use. In this embodiment, the protective layer is peeled away and the entire tag is adhered to a container across an opening. In either embodiment, any attempt to remove the tag from luggage or to open the container will disable the tag in a way that will signal that the tag has been tampered. In other embodiments, the tag can be equipped so that its movements can be monitored and tracked.

In FIG. 12, there are shown cargo containers 310, 320, 330 with appropriate tags 340 affixed across access doors 312, 322, 332. As explained above, any tampering with the container or unauthorized opening will disable the tag and the condition can be sensed remotely, signalling the tampering. In accordance with the present invention, a record can be created with the verified identity of the person who packed the container, the person who sealed the container, the point of origin and the intended destination. This record accompanies the container and can be subjected to interrogation and verification through the multiple system checks taught in the present invention. Moreover, a "condition check" can be added for entities, be they human or cargo. These condition checks can, for example, be a biometric parameter of odor or other body property that can be remotely sensed. Such sensing can also include the detection of explosives or their components or even radioactivity. Similarly, cargo can be checked for many of the same things.

Thus there has been shown in several embodiments, methods and apparatus for verifying identity utilizing at least three separate comparisons, information from a portable record, an original condition, and a last seen condition. Certain biometric data can be acquired by passive observation and this too becomes part of the comparison. Biometric data can include thermograms, opthalmic scans, fingerprints, DNA sampling, body conditions, including perspiration and any other significant parameter that can be detected. In high security risk situations, even invasive techniques might be justified to verify identity. Of course separate parts of the system disclosed herein may be used advantageously where cost or other considerations do not warrant full utilization of the apparatus or method of the invention as described above. However it will of course be realized that the above has been given only by way of illustrative example of the invention and that all such modifications and variations thereto as would be apparent to persons skilled in the art are deemed to fall within the broad scope and ambit of the invention as is herein set forth.

What is claimed as new is:

1. An identity checking method for verifying the identity of an individual including the steps of:
   (a.) capturing the individual's initial biometric data at an initial time and storing it on a database;
   (b.) associating the initial biometric data captured in step (a) with a unique description, storing said data and description in said database and storing said biometric data and said unique description in an electronic document issued to the individual;
   (c.) capturing contemporary biometric data and said unique description of the individual by remote sensing means at a point of departure of the individual;
   (d.) interrogating said database for said initial biometric data corresponding to said captured unique description;
   (e.) comparing said contemporary biometric data with corresponding initial biometric data retrieved from interrogating step (d);
   (f.) making a decision on the basis of the degree of correlation in comparing step (e);
   (g.) forwarding data including said captured contemporary biometric data and unique description to a local database at a point of arrival of the individual;
   (h.) capturing arrival biometric data and said unique description of the individual by remote sensing of the individual at said point of arrival;
   (i.) comparing the captured arrival biometric data and unique description of step (h) with the forwarded captured contemporary biometric data and unique description of step (g);
   (j.) making a decision on the basis of identity between the forwarded and captured unique descriptions of steps (g) and (h) and the degree of correlation between the forwarded and captured biometric data of steps (g) and (h);
   (k.) interrogating said database for the initial biometric data corresponding to the unique description captured in step (h);
   (l.) comparing said arrival biometric data captured in step (h) with said corresponding initial biometric data; and
   (m.) making a decision on the basis of the degree of correlation of biometric data in step (l),
   whereby passage through said point of arrival is conditioned upon favorable decisions made in all of the comparing steps.

2. A method as claimed in claim 1, wherein said database includes protected identification data specific to the appearance and\or condition of an individual.

3. A method as claimed in claim 1, wherein said database includes unique information in regard to medical condition, blood type and other detectable health parameters.

4. A method as claimed in claim 3, wherein confirmation of an individual's identity at said destination can be used by a medical practitioner to remotely prescribe drugs and other treatment.

5. A method according to claim 1, wherein said electronic document includes a radio frequency responsive identification device including distinguishing means by which a receiving station can distinguish said identification device from other radio frequency responsive devices.

6. A method as claimed in claim 5, wherein said distinguishing means includes a built-in time delay for delaying the transmission of the signal.

7. A method as claimed in claim 1 and further including a validation step for checking the validity of the biometric data information obtained.

8. A method as claimed in claim 7, wherein the validation step includes the step of sensing the document, to determine if the unique description stored therein is identical to the unique description stored in said database and, if not, flagging the document for further investigation.

9. A method according to claim 1, including a data protection step wherein at least some of the accessible data on said electronic document is protected by a method selected from encryption, encoding and associating said data with a secure access code.

10. A method as claimed in claim 1 including an encryption step wherein information transmitted to a receiving station may be understood only by a receiving station utilizing a corresponding decrypting apparatus.

11. The identity checking method of claim 1, further including the steps of:
   (n) associating a watch list value according to the individual's known watch status with said initial biometric data to form a watch database;
   (o) comparing said contemporary biometric data with the items of initial biometric data associated with the stored watch list value; and
   (p) making a decision on the basis of the degree of correlation in step (o) to an entry in said watch list database,
   whereby the individual's watch list status can be used to control further movement.

12. A method according to claim 1, wherein said database is a national database of the citizens of that nation.

13. A method according to claim 12, wherein said database further includes data of past visitors to said nation.

14. A method according to claim 12, wherein said electronic document is a national identification card.

15. A method according to claim 12, wherein said national database forms part of an international database and can be networked with the corresponding database of at least one other nation.

16. A method according to claim 1, wherein said electronic document contains data enabling said document to function as a passport.

17. The method of claim 1 in which said document has a surface in which machine readable information can be encoded that serves as a unique description of the document throughout its useful life.

18. The method of claim 17 including the further steps of:
   (n.) including in the encoding the unique description of the document with the unique description of the entity with which the document is associated; and
   (o.) at each comparing step, confirming that the entity and assigned document are still together and signaling any instance when the document is not accompanying the entity to which it has been assigned.

19. The method of claim 17 in which the document unique description includes the identity of the issuer of the document.

20. The method of claim 1 including the further step of issuing a receipt to the individual.

21. An identity checking method for verifying the identity of an individual including the steps of:
   a. capturing the individual's initial biometric data at an initial time and storing it on an enrollment database;
   b. associating the initial biometric data captured in step (a) with a unique description, storing said data and description in said enrollment database and storing said biometric data and said unique description in an electronic database in a document issued to the individual;

c. capturing departure biometric data and said unique description of the individual by sensing means at a point of departure of the individual;

d. forwarding data captured at the point of departure, including said captured biometric data and unique description to a local database at a point of arrival of the individual;

e. capturing arrival biometric data and said unique description of the individual by sensing means at said point of arrival;

f. comparing the captured arrival biometric data and description of step (e) with the forwarded captured departure biometric data and unique description of step (d);

g. making a decision on the basis of identity between the forwarded and captured unique descriptions of steps (d) and (e) and the degree of correlation between the forwarded and captured biometric data of steps (d) and (e);

h. interrogating said enrollment database for the initial biometric data corresponding to the unique description captured in step (e);

i. comparing said arrival biometric data captured in step (e) with corresponding initial biometric data; and j. making a decision on the basis of the degree of correlation of biometric data in step (i), whereby passage through said point of arrival is conditioned upon a high degree of correlation in said comparing steps to continue travel and a low degree of correlation to limit future passage.

22. The method of claim 21 including the steps of capturing data from the document database and comparing such data with other captured data to allow further passage if such comparisons are favorable.

23. The method of claim 22 including the further step of comparing data from the document database with data from said enrolling database and conditioning future passage on a positive comparison.

24. The identity checking method of claim 21 above, including the additional steps of:

k. sensing said document database at the point of arrival and capturing the unique description and biometric data stored therein;

l. comparing the unique description captured from said document database with unique description data forwarded from the point of departure;

m. correlating the biometric data forwarded from the point of departure with the biometric data captured from the electronic document; and n. conditioning future passage on the degree of correlation, whereby a high correlation allows continued travel and a low degree of correlation limits future passage.

25. An identity checking method for verifying the identity of an individual including the steps of:

a. capturing the individual's initial biometric data at an initial time and storing it on an enrollment database;

b. associating the initial biometric data captured in step (a) with a unique description, storing said data and description in an electronic database in a document issued to the individual;

c. capturing departure biometric data and said unique description of the individual from the document at a point of departure of the individual;

d. forwarding data captured at the point of departure, including said captured biometric data and unique description to a local database at a point of arrival of the individual;

e. capturing arrival biometric data and said unique description of the individual from the document at said point of arrival;

f. comparing the captured arrival biometric data and unique description of step (e) with the forwarded captured departure biometric data and unique description of step (d);

g. making a decision on the basis of identity between the forwarded and captured unique descriptions of steps (d) and (e) and the degree of correlation between the forwarded and captured biometric data of steps (d) and (e);

h. interrogating said enrollment database for the initial biometric data corresponding to the unique description captured in step (e);

i. comparing said arrival biometric data captured in step (e) with corresponding initial biometric data; and j. making a decision on the basis of the degree of correlation of biometric data in step (i), whereby passage through said point of arrival is conditioned upon a high degree of correlation in said comparing steps to continue travel and a low degree of correlation to limit future passage.

* * * * *